United States Patent
Shin et al.

(10) Patent No.: US 10,244,378 B2
(45) Date of Patent: Mar. 26, 2019

(54) METHOD FOR SELECTING NEIGHBORING UE TO PERFORM D2D COMMUNICATION

(71) Applicant: LG ELECTRONICS INC., Seoul (KR)

(72) Inventors: Seokmin Shin, Seoul (KR); Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 15/545,284

(22) PCT Filed: Jan. 20, 2016

(86) PCT No.: PCT/KR2016/000581
§ 371 (c)(1),
(2) Date: Jul. 20, 2017

(87) PCT Pub. No.: WO2016/117922
PCT Pub. Date: Jul. 28, 2016

(65) Prior Publication Data
US 2018/0007529 A1    Jan. 4, 2018

Related U.S. Application Data

(60) Provisional application No. 62/105,213, filed on Jan. 20, 2015.

(51) Int. Cl.
*H04W 8/00* (2009.01)
*H04W 48/00* (2009.01)
(Continued)

(52) U.S. Cl.
CPC ............. *H04W 8/005* (2013.01); *H04J 11/00* (2013.01); *H04W 48/17* (2013.01);
(Continued)

(58) Field of Classification Search
CPC ........ H04J 11/00; H04W 8/005; H04W 48/17
See application file for complete search history.

(56) References Cited

U.S. PATENT DOCUMENTS 8,730,903 B2    5/2014    Seo et al.

FOREIGN PATENT DOCUMENTS

| KR | 2009-0075102 A | 7/2009 |
| KR | 2012-0048445 A | 5/2012 |

OTHER PUBLICATIONS

Samsung, "D2D Synchronization Procedure for Out-of-Network Coverage", 3GPP TSG RAN WG1, Meeting #77, R1-142122, Agenda Item 6.2.5.3.3, May 2014, 5 pages.
(Continued)

*Primary Examiner* — Kevin C. Harper
*Assistant Examiner* — Henry Baron
(74) *Attorney, Agent, or Firm* — Lee, Hong, Degerman, Kang & Waimey

(57) ABSTRACT

A disclosure of the present specification provides a method for selecting, by a user equipment (UE) located outside a coverage of a base station, a neighboring UE with which the UE will perform device-to-device (D2D) communication. According to the method, it is possible to quickly find out whether a neighboring UE is located within the coverage of a base station and is capable of operating as a relay, through a DMRS and a detection signal received from the neighboring UE.

8 Claims, 16 Drawing Sheets

(51) Int. Cl.
*H04J 11/00* (2006.01)
*H04W 72/02* (2009.01)
*H04W 88/04* (2009.01)
*H04L 5/00* (2006.01)

(52) U.S. Cl.
CPC ........... *H04L 5/0007* (2013.01); *H04W 72/02* (2013.01); *H04W 88/04* (2013.01)

(56) References Cited

OTHER PUBLICATIONS

LG Electronics, "D2D-Related Information Sharing Between In-Coverage UEs and Out-Coverage UEs", 3GPP TSG RAN WG1, Meeting #77, R1-142158, Agenda Item 6.2.5.3.2, May 2014, 5 pages.

PCT International Application No. PCT/KR2016/000581 International Search Report dated Apr. 25, 2016, 4 pages.

DM-RS

METHOD FOR SELECTING NEIGHBORING UE TO PERFORM D2D COMMUNICATION

CROSS-REFERENCE TO RELATED APPLICATIONS

This application is the National Stage filing under 35 U.S.C. 371 of International Application No. PCT/KR2016/000581, filed on Jan. 20, 2016, which claims the benefit of U.S. Provisional Application No. 62/105,213, filed on Jan. 20, 2015, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, the communication between UEs which are physically closed to each other, that is, device to device (D2D) communication is required due to an increase in user requirements for a social network service (SNS).

Due to the benefit of the D2D communication, the communication between UEs which are located outside the coverage of a base station may become available.

However, there is a problem that a considerable time is required for a UE located outside the coverage of a base station to identify that other neighboring UE is located in the coverage of the base station, and when other neighboring UE is located in the coverage of the base station, to identify whether it is available to perform as a relay for relaying a D2D communication to the base station.

SUMMARY OF THE INVENTION

Accordingly, the disclosure of the specification has been made in an effort to solve the problem.

In order to accomplish the object described above, a disclosure of the present specification provides a method for selecting a neighboring user equipment (UE) that is going to perform a Device to Device (D2D) communication performed by a UE located out of coverage of a base station. The method may include receiving a Physical Sidelink Discovery Channel (PSDCH) including a discovery signal and a De-Modulation Reference Signal (DMRS) for demodulating the PSDCH from one or more neighboring UEs, wherein the PDSCH is scrambled by a scrambling sequence; determining whether the one or more neighboring UEs are located in the coverage of the base station based on the received DMRS; determining whether the one or more neighboring UEs are able to operate as a relay based on the a scrambling sequence used for scrambling the PSDCH; and selecting a UE located in the coverage of the base station and able to operate as a relay among the one or more neighboring UEs.

The step of determining whether the one or more neighboring UEs are located in the coverage of the base station may include: obtaining a base sequence number of the received DMRS through a blind detection; and determining whether the one or more neighboring UEs are located in the coverage of the base station based on the obtained base sequence number.

The step of determining whether the one or more neighboring UEs are able to operate as a relay may include: obtaining a scrambling sequence used for scrambling the PSDCH through a blind detection; obtaining one or more initializing parameters used for the neighboring UE for initializing the obtained scrambling sequence through a blind detection; and determining whether at least one neighboring UE is able to operate as a relay based on the one or more initializing parameters.

The one or more initializing parameters may be radio network temporary identifiers (RNTIs).

The step of selecting the UE may include: selecting at least one UE located in the coverage of the base station among the one or more neighboring UEs; and selecting a UE operable as a relay among the at least one UE.

The method may further include selecting a resource for transmitting data to the selected UE; and transmitting a control channel including a scheduling assignment for the selected resource to the selected UE.

The method may further include receiving the control channel including the scheduling assignment from the selected UE.

In addition, when a resource indicated by the scheduling assignment included in the transmitted control channel and a resource indicated by the scheduling assignment in the received control channel are overlapped, the method may further include transmitting a silent signal for withdrawing the scheduling assignment included in the transmitted control channel to the selected UE.

In order to accomplish the object described above, a disclosure of the present specification provides a user equipment (UE) selecting a neighboring UE that is going to perform a Device to Device (D2D) communication with being located out of coverage of a base station. The UE may include a transmitting and receiving unit; and a processor for controlling the transmitting and receiving unit. The processor may perform receiving a Physical Sidelink Discovery Channel (PSDCH) including a discovery signal and a De-Modulation Reference Signal (DMRS) for demodulating the PSDCH from one or more neighboring UEs, wherein the PDSCH is scrambled by a scrambling sequence; determining whether the one or more neighboring UEs are located in the coverage of the base station based on the received DMRS; determining whether the one or more neighboring UEs are able to operate as a relay based on the a scrambling sequence used for scrambling the PSDCH; and selecting a UE located in the coverage of the base station and able to operate as a relay among the one or more neighboring UEs.

Advantageous Effects

According to the disclosure of the present specification, the problems of the above-described prior art are solved.

DESCRIPTION OF EXEMPLARY EMBODIMENTS

Figure 1:
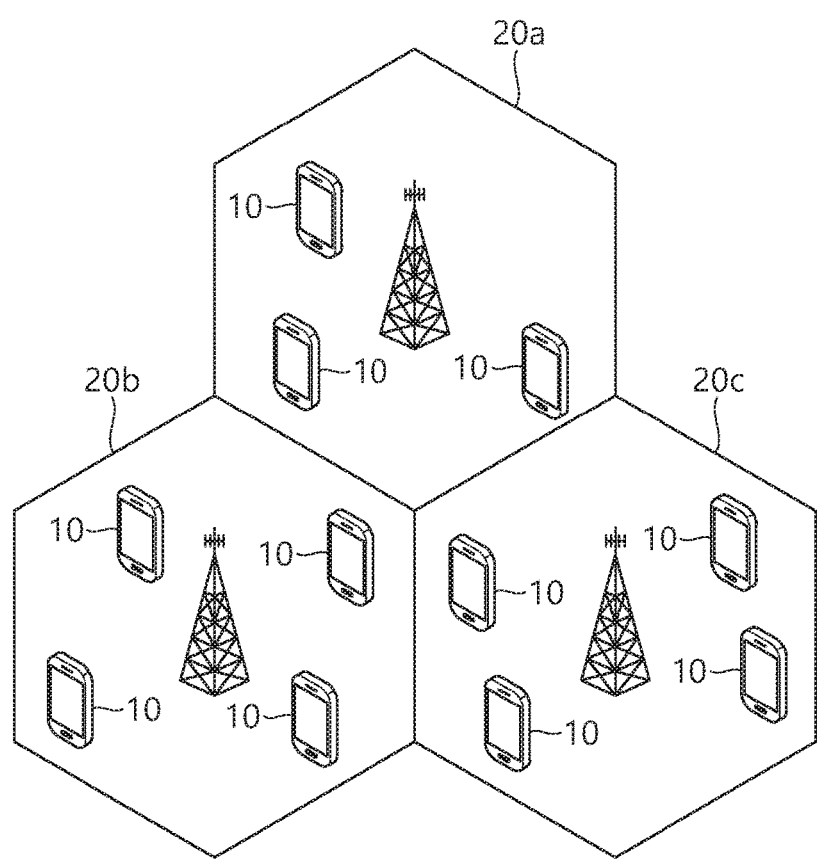
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
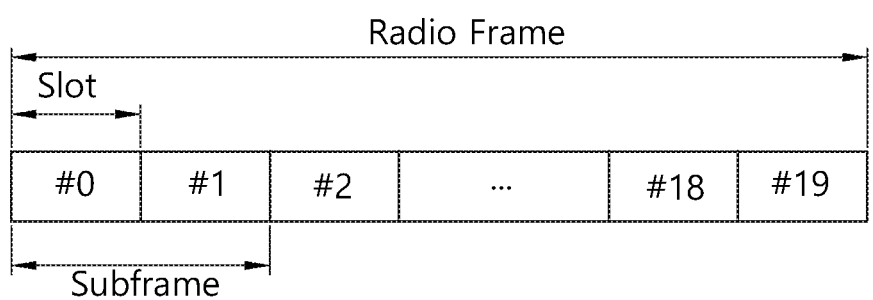
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
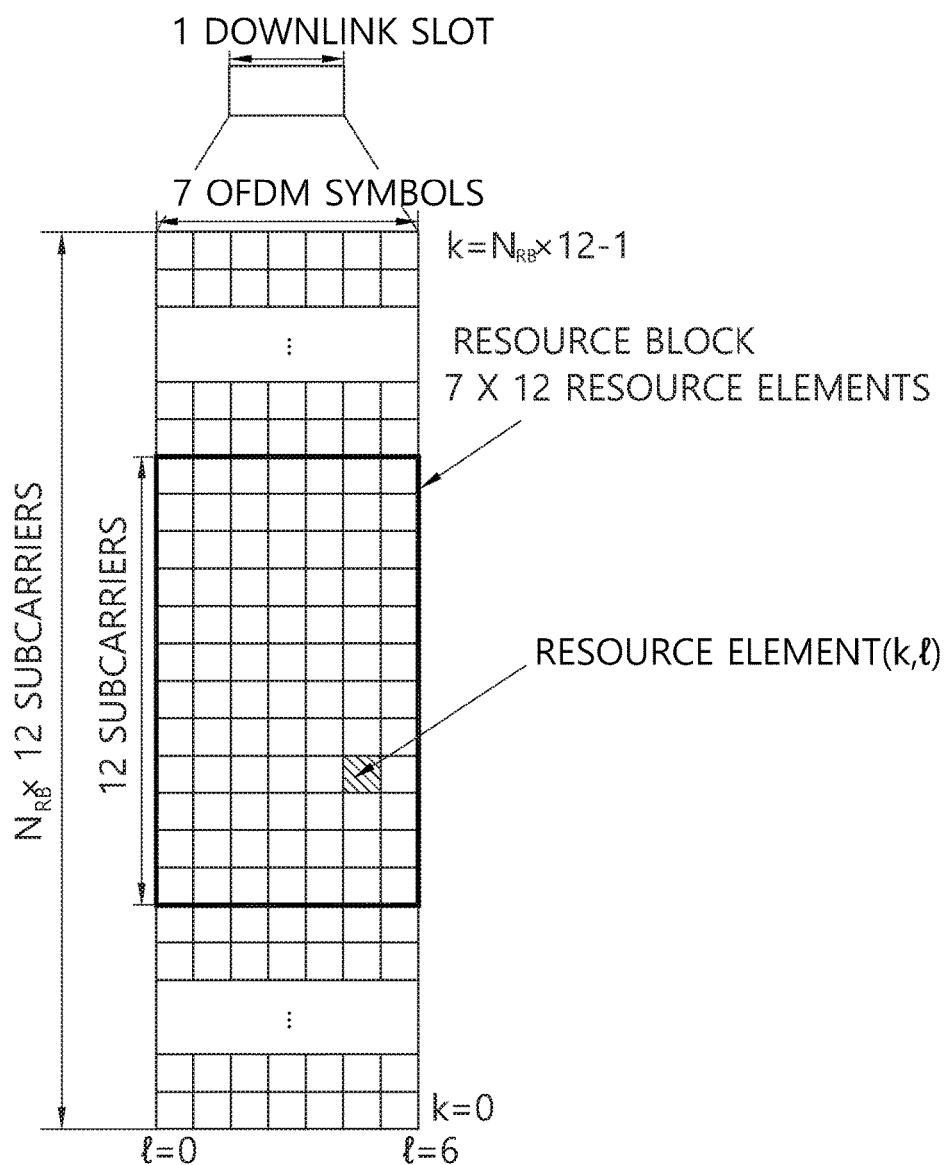
FIG. 3 illustrates the architecture of a downlink radio frame according to time division duplex (TDD) in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
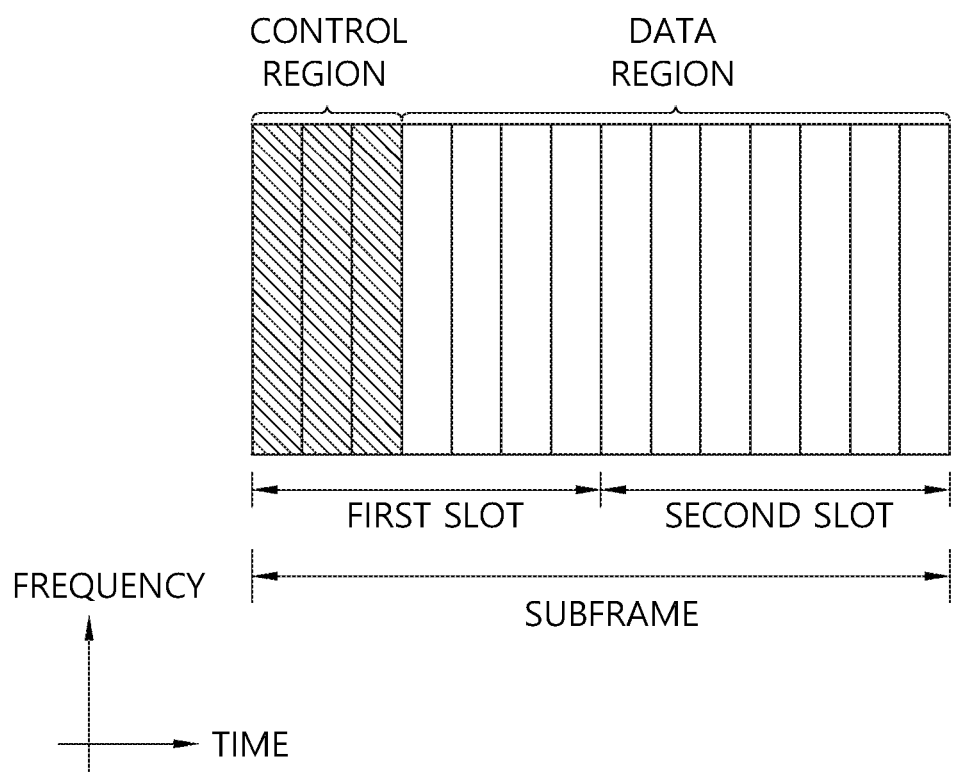
FIG. 4 illustrates an example resource grid for one uplink or downlink slot in 3GPP LTE.

FIG. 4 illustrates the architecture of a downlink subframe.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 5:
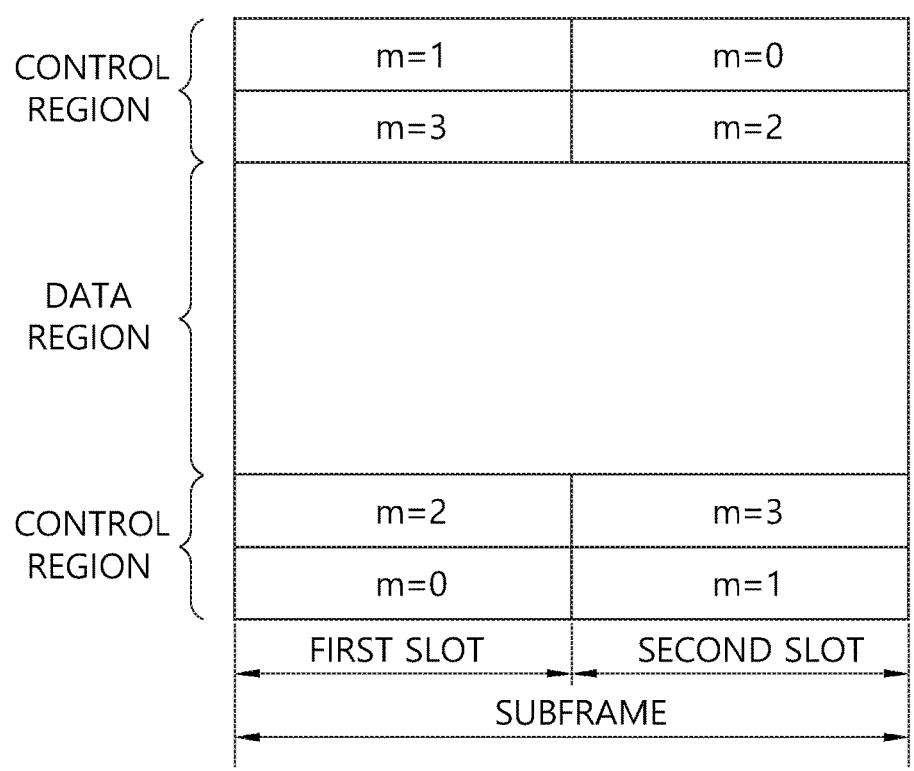
FIG. 5 illustrates the architecture of a downlink subframe.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Uplink Reference Signal>

Hereinafter, the uplink reference signal will be described.

The reference signal is generally transported in sequence. As the sequence of the reference signal, a predetermined sequence may be used without a particular limit. As the reference signal sequence, a sequence (PSK-based computer generated sequence) generated through a phase shift keying (PSK) based computer may be used. Examples of the PSK include binary phase shift keying (BPSK), quadrature phase shift keying (QPSK), and the like. Alternatively, as the reference signal sequence, a constant amplitude zero auto-correlation (CAZAC) sequence may be used. Examples of the CAZAC sequence include a zadoff-chu (ZC) based sequence, a ZC sequence with cyclic extension, a ZC sequence with truncation, and the like. Alternatively, as the reference signal sequence, a pseudo-random (PN) sequence may be used. Examples of the PN sequence include an m-sequence, a sequence generated through the computer, a gold sequence, a Kasami sequence, and the like. Further, as the reference signal sequence, a cyclically shifted sequence may be used.

The uplink reference signal may be divided into the demodulation reference signal (DMRS) and the sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling. The base station estimates an uplink channel through the received sounding reference signal and uses the estimated uplink channel in the uplink scheduling. The SRS is not associated with transmission of the PUSCH or PUCCH. The same type of primary sequence may be used for the DMRS and the SRS. Meanwhile, precoding applied to the DMRS in uplink multi-antenna transmission may be the same as precoding applied to the PUSCH. Cyclic shift separation is a primary scheme that multiplexes the DMRS. In the 3GPP LTE-A system, the SRS may not be precoded and further, may an antenna specific reference signal.

The reference signal sequence $r_{u,v}^{(\alpha)}(n)$ may be defined based on a primary sequence $b_{u,v}(n)$ and a cyclic shift $\alpha$ by an equation given below.

$$r_{u,v}^{(\alpha)}(n) = e^{j\alpha n} b_{u,v}(n), \ 0 \le n < M_{sc}^{RS} \quad \text{[Equation 1]}$$

In Equation 1, $M_{sc}^{RS} = m \ast N_{sc}^{RB}$ ($1 \le m \le N_{RB}^{max,UL}$) represents the length of the reference signal sequence. $N_{sc}^{RB}$ represents the size of a resource block represented by the number of subcarriers in the frequency domain and $N_{RB}^{max,UL}$ represents a maximum value of an uplink bandwidth represented by the multiple of $N_{sc}^{RB}$. A plurality of reference signal sequences may be defined by differently applying a which is the cyclic shift value from one primary sequence.

The base sequence $b_{u,v}(n)$ is divided into a plurality of groups and in this case, $u \in \{0, 1, \ldots, 29\}$ represents a group number and v represents a base sequence number in a group. The base sequence depends on the length ($M_{sc}^{RS}$) of the base sequence. Each group includes one base sequence (v=0) in which the length is $M_{sc}^{RS}$ with respect to m of $1 \le m \le 5$ and includes two base sequences (v=0, 1) in which the length is $M_{sc}^{RS}$ with respect to m of $6 \le m \le n_{RB}^{max,UL}$. A sequence group number u and a base sequence number v in the group may vary depending on a time like group hopping or sequence hopping.

When the length of the reference signal sequence is $3N_{sc}^{RB}$ or more, the base sequence may be defined by an equation given below.

$$b_{u,v}(n) = x_q(n \bmod N_{ZC}^{RS}), \ 0 \le n < M_{sc}^{RS} \quad \text{[Equation 2]}$$

In the above equation, q represents a root index of a Zadoff-Chu (ZC) sequence. $N_{ZC}^{RS}$ represent the length of the ZC sequence may be given as a prime number smaller than $M_{sc}^{RS}$.

The ZC sequence having the root index of q may be defined by Equation 4.

$$x_q(m) = e^{-j\frac{\pi q m(m+1)}{N_{ZC}^{RS}}}, \ 0 \le m \le N_{ZC}^{RS} - 1 \quad \text{[Equation 3]}$$

In the above equation, q may be given by an equation given below.

$$q = \lfloor \bar{q} + 1/2 \rfloor + v \cdot (-1)^{\lfloor 2\bar{q} \rfloor}$$

$$q = N_{ZC}^{RS} \cdot (u+1)/31 \quad \text{[Equation 4]}$$

When the length of the reference signal sequence is 3NscRB or less, the primary sequence may be defined by an equation given below.

$$b_{u,v}(n) = e^{j\phi(n)\pi/4}, \ 0 \le n \le M_{sc}^{RS} - 1 \quad \text{[Equation 5]}$$

A table given below shows an example in which $\phi(n)$ is defined when MscRS=NscRB.

TABLE 1

| | $\phi(0), \ldots, \phi(11)$ | | | | | | | | | | |
|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | 3 | 3 | 1 | −1 |

A table given below shows an example in which $\phi(n)$ is defined when $M_{sc}^{RS} = 2 \ast N_{sc}^{RB}$.

TABLE 2

| | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | 1 | −1 | −3 | −1 | 1 | −1 | 3 | 1 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −1 | −3 | −3 | −3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | −1 | −1 | 3 | 1 | −1 | 3 | 1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Hopping of the reference signal may be applied as described below.

A sequence group number u of slot ns may be defined based on a group hopping pattern $f_{gh}(n_s)$ and a sequence shift pattern $f_{ss}$ by an equation given below.

$$u = (f_{gh}(n_s) + f_{ss}) \bmod 30 \quad \text{[Equation 6]}$$

17 different group hopping patterns and 30 different sequence shift patterns may exist. Group hopping may be applied or not applied by a group-hopping-enabled parameter which is a cell specific parameter provided by the higher layer. Further, the group hopping for the PUSCH may not be applied to specific UE by a disable-sequence-group-hopping parameter which is a UE specific parameter. The PUCCH and the PUSCH may have the same group hopping pattern and different sequence shift patterns.

The group hopping pattern $f_{gh}(n_s)$ is the same with respect to the PUSCH and the PUCCH and may be defined by an equation given below.

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases} \quad \text{[Equation 7]}$$

In the above equation, c(i) as an imitation pseudo-random sequence which is a PN sequence may be defined by a gold sequence having a length of −31. An equation given below shows one example of the gold sequence c(n).

$$c(n) = (x_1(n+N_c) + x_2(n+N_c)) \bmod 2$$

$$x_1(n+31) = (x_1(n+3) + (n)) \bmod 2$$

$$x_2(n+31) = (x_2(n+3) + x_2(n+2) + x_1(n+1) + x_1(n)) \bmod 2 \quad \text{[Equation 8]}$$

Herein, Nc=1600, x1(i) represents a 1 m-th sequence, and x2(i) represents a 2 m-th sequence. An imitation pseudo-number sequence generator may be initialized to $$c_{init} = \left\lfloor \frac{N_{ID}^{cell}}{30} \right\rfloor$$

at the beginning of each radio frame.

Definition of the sequence shift pattern $f_{ss}$ may be different with respect to the PUCCH and the PUSCH. The sequence shift pattern of the PUCCH may be given as fssPUCCH=NIDcell mod 30. The sequence shift pattern of the PUSCH may be given as fssPUSCH=(fssPUCCH+Δss) mod 30 and Δss∈{0, 1, . . . , 29} may be configured by the higher layer.

The sequence hopping may be applied only a reference signal sequence having a length longer than $6N_{sc}^{RB}$. With respect to a reference signal sequence having a length shorter than $6N_{sc}^{RB}$, the primary sequence number is given as v=0 in the primary sequence group. With respect to the reference signal sequence having the length longer than $6N_{sc}^{RB}$, the primary sequence number v in the primary sequence group in slot ns may be defined by Equation 10.

$$v = \begin{cases} c(n_s) & \text{if group hopping is disabled and sequence hopping is enabled} \\ 0 & \text{otherwise} \end{cases} \quad \text{[Equation 9]}$$

c(i) may be expressed by an example of Equation 9 given above. The sequence hopping may be applied or not applied by a sequence-hopping-enabled parameter which is a cell specific parameter provided by the higher layer. Further, the sequence hopping for the PUSCH may not be applied to specific UE by the disable-sequence-group-hopping parameter which is the UE specific parameter. The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

A PUSCH DMRS sequence $r_{PUSCH}^{(\lambda)}(.)$ depending on a layer $\lambda(0, 1, \ldots, \gamma-1)$ may be defined by Equation 11.

$$r_{PUSCH}^{(\lambda)}(m \cdot M_{sc}^{RS} + n) = w^{(\lambda)}(m) r_{u,v}^{(\alpha_\lambda)}(n) \quad \text{[Equation 10]}$$

In the above equation, m=0, 1, ... and n=0, ..., $M_{sc}^{RS}$−1. $M_{sc}^{RS}$=$M_{sc}^{PUSCH}$. An orthogonal sequence $w^{(\lambda)}(m)$ may be determined according to a table to be described below.

In the slot ns, the cyclic shift may be given as $2\pi n_{cs}/12$ and $n_{cs}$ may be defined by an equation given below.

$$n_{cs,\lambda} = (n_{DMRS}^{(1)} + n_{DMRS,\lambda}^{(2)} + n_{PN}(n_s)) \bmod 12 \quad \text{[Equation 11]}$$

In the above equation, $n^{(1)}_{DMRS}$ may be determined according to a cyclicShift parameter provided by the higher layer. A table given below shows an example of $n^{(1)}_{DMRS}$ determined according to the cyclicShift parameter.

TABLE 3

| Parameter | $n^{(1)}_{DMRS}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Referring back to the above equation, $n^{(2)}_{DMRS,\lambda}$ may be determined by a DMRS cyclic shift field in DCI format 0 for the transport block depending on corresponding PUSCH transmission. A table given below shows an example of $n^{(2)}_{DMRS,\lambda}$ determined according to DMRS cyclic shift field.

TABLE 6

| DMRS cyclic shift field | $n^{(2)}_{DMRS,\lambda}$ | | | | $[w^{(\lambda)}(0)\ w^{(\lambda)}(1)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

$n_{PN}(n_s)$ may be defined by an equation given below.

$$n_{PN}(n_s) = \sum_{i=0}^{7} c(8 N_{symb}^{UL} \cdot n_s + i) \cdot 2^i \quad \text{[Equation 12]}$$

c(i) may be expressed by the example of Equation 8 given above and applied for each cell of c(i). The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

The vector of the reference signal may be precoded by an equation given below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} \tilde{r}_{PUSCH}^{(0)} \\ \vdots \\ \tilde{r}_{PUSCH}^{(v-1)} \end{bmatrix} \quad \text{[Equation 13]}$$

In the above equation, P represents the number of antenna ports used for the PUSCH transmission. W represents a precoding matrix. With respect to PUSCH transmission using a single antenna port, P=1, W=1, and γ=1. Further, with respect to spatial multiplexing, P=2 or 4.

With respect to each antenna port used for the PUSCH transmission, the DMRS sequence is multiplied by an amplitude scaling factor βPUSCH and sequentially mapped to the resource block. A set of physical resource blocks used for the mapping is the same as the set of physical resource blocks used for the PUSCH transmission. In the subframe, the DMRS sequence may be first mapped to the resource element in a direction in which the DMRS sequence increases in the frequency domain and thereafter, in a direction in which the slot number increases. The DMRS sequence may be mapped to a fourth SC-FDMA symbol (SC-FDMA symbol 3) in the case of the normal CP and a third SC-FDMA symbol (SC-FDMA symbol 2) in the case of the extension CP.

Figure 6A:
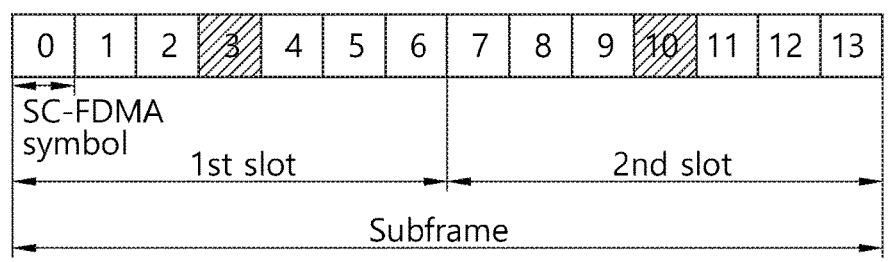
FIGS. 6a and 6b are one example of a subframe in which a DMRS for a PUSCH is transmitted.
Figure 6A:
Figure 6B:
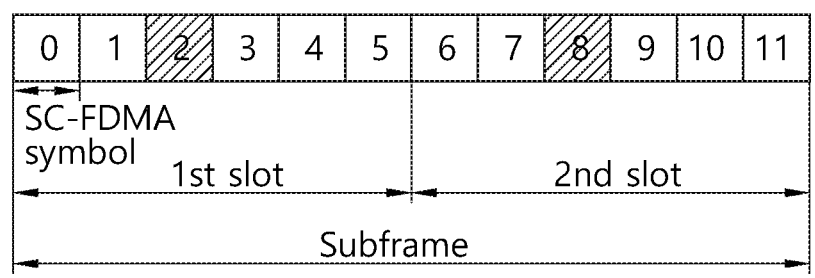

FIGS. 6a and 6b are one example of a subframe in which a DMRS for a PUSCH is transmitted.

The structure of the subframe in FIG. 6a shows a case of the normal CP. The subframe includes the first slot and the second slot. Each of the first slot and the second slot includes 7 SC-FDMA symbols. Symbol indexes of 0 to 13 are granted to 14 SC-FDMA symbols in the subframe. The reference signal may be transmitted through the SC-FDMA symbols having symbol indexes 3 and 10. The reference signal may be transmitted by using the sequence. The Zadoff-Chu (ZC) sequence may be used as the reference signal sequence and various ZC sequences may be generated according to a root index and a cyclic shift value. The base station allocates different cyclic shift values to the terminal to estimate channels of a plurality of terminals through an orthogonal sequence or quasi-orthogonal sequence. Locations of the frequency domains occupied by the reference signal in may be the same as each other or different from each other in two slots in the subframe. In two slots, the same reference signal sequence is used. Data may be transmitted through the residual SC-FDMA symbols other than the SC-FDMA symbol in which the reference signal is transmitted.

The structure of the subframe in FIG. 6b shows a case of the extension CP. The subframe includes the first slot and the second slot. Each of the first slot and the second slot includes 6 SC-FDMA symbols. Symbol indexes of 0 to 11 are granted to 12 SC-FDMA symbols in the subframe. The reference signal is transmitted through the SC-FDMA symbols having symbol indexes 2 and 8. The data is transmitted through the residual SC-FDMA symbols other than the SC-FDMA symbol in which the reference signal is transmitted.

<D2D (Device to Device) Communications>

On the other hand, hereinafter, the D2D communication expected to be introduced in a next-generation communication system will be described.

Figure 7:
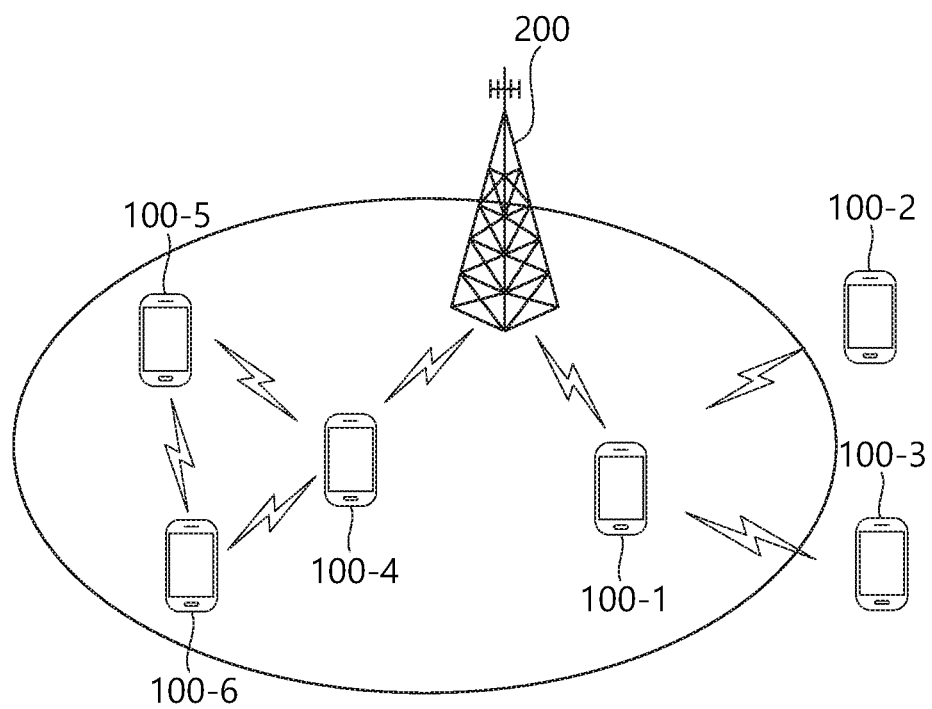
FIG. 7 illustrates a concept of the device to device (D2D) communication expected to be introduced in a next-generation communication system.

FIG. 7 illustrates a concept of the device to device (D2D) communication expected to be introduced in a next-generation communication system.

The communication between UEs which are physically closed to each other, that is, device to device (D2D) communication) is required due to an increase in user requirements for a social network service (SNS).

In order to reflect the aforementioned requirements, as illustrated in FIG. 7, a scheme that allows the UE#1 100-1, the UE#2 100-2, and the UE#3 100-3 or the UE#4 100-4, the UE#5 100-5, and the UE#6 100-6 to directly communicate with each other without intervention of a base station (eNodeB) 200 has been discussed. Of course, the UE#1 100-1 and the UE#4 100-4 may directly communicate with each other under a help of the base station (eNodeB) 200. Meanwhile, the UE#4 100-4 may serve as a repeater for the UE#5 100-5 and the UE#6 100-6. Similarly, the UE#1 100-1 may serve as the repeater for the UE#2 100-2 and the UE#3 100-3.

Meanwhile, a link between the UEs used in the D2D communication may be called a sidelink.

Meanwhile, the physical channels used in the sidelink are as follows.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

As described so far, it has been discussed that the D2D communication between UEs is introduced in the next generation system.

Figure 8:
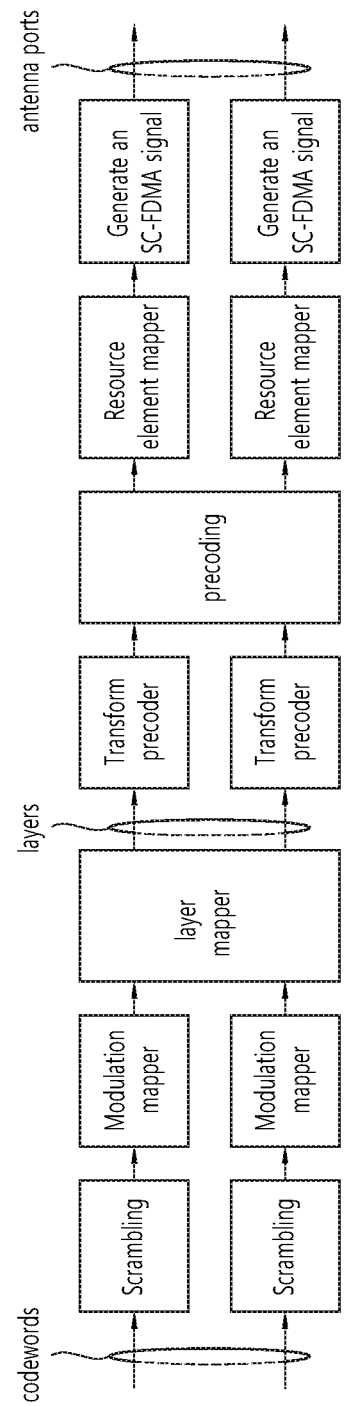
FIG. 8 illustrates a signal processing process for transmitting a PDSCH.

FIG. 8 illustrates a signal processing process for transmitting a PDSCH.

Referring to FIG. 8, a scrambling unit, a Modulation Mapper, a Layer Mapper, a transform precoder, a procoding unit, a resource element mapper and a SC-FDMA signal generation unit are included. The scrambling unit performs scrambling for an input codeword, that is, a block of $b(0), \ldots, b(M_{bit}-1)$ bits. The Modulation Mapper disposes the scrambled codeword to a modulation symbol that represents a location on a signal constellation. The resource element mapper maps the symbol outputted from the precoding unit to a resource element.

In describing the operation with reference to FIG. 8, the inputted codeword, that is, the block of $b(0), \ldots, b(M_{bit}-1)$ bits is scrambled by the scrambling unit. And, after being generated as an SC-FDMA signal through the modulation by the Modulation Mapper, the layer mapping by the Layer Mapper, procoding and the resource element mapping by the resource element mapper, the codeword is transmitted through an antenna. The resource element mapper maps the symbol outputted from the precoding unit shown in the drawing to a resource element.

The scrambling sequence used for scrambling a PSDCH is generated as represented in Equation 8, and a generator of the scrambling sequence is initialized as $C_{init}=510$.

A PSDCH is modulated in QPSK scheme.

Figure 9:
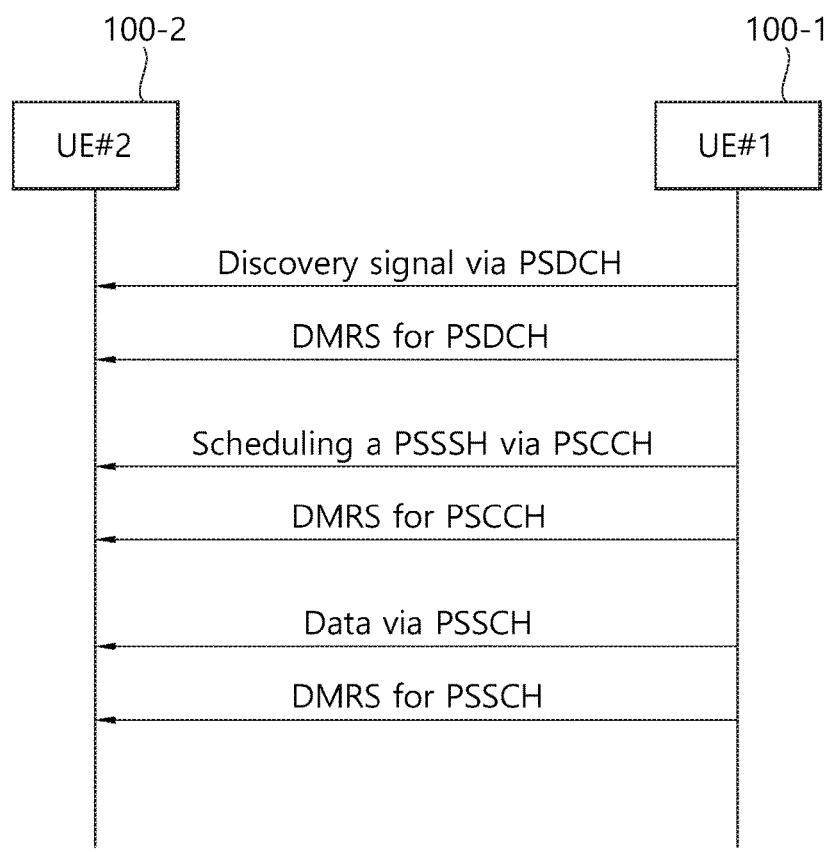
FIG. 9 illustrates an example of a D2D communication between UE#2 and UE#1, where UE#2 is located outside the coverage of a base station as shown in FIG. 7.

FIG. 9 illustrates an example of a D2D communication between UE#2 and UE#1, where UE#2 is located outside the coverage of a base station as shown in FIG. 7.

Referring to FIG. 9, an example of communication between UE#2 100-2 located outside the coverage of a base station as shown in FIG. 7 and UE#1 100-1 located in the coverage of the base station. In this case, since the UE#2 100-2 is located outside the coverage of the base station, the UE#2 100-2 is to find a UE that is available to relay a D2D communication to the base station.

First, in order to detect whether there is a proper neighboring UE is existed for a D2D communication, or to notify the existence of UE#1 100-1 itself, the UE#1 100-1 may transmit a Discovery Signal through a PSDCH. In addition, the UE#1 100-1 may transmit a DMRS for demodulating the PSDCH. In this case, the DMRS may be generated in the same way of generating the DMRS for a PUSCH described using Equation 1 to Equation 12, and may be mapped to a symbol in a subframe as shown in FIG. 6 and FIG. 6b.

Meanwhile, in addition, the UE#1 100-1 may transmit a scheduling assignment (SA) through a PSCCH, and may transmit a DMRS for demodulating the PSCCH. And, the UE#1 100-1 may transmit a PSSCH based on the SA, and may transmit a DMRS for demodulating the PSSCH.

Here, the PSDCH including the discovery signal, the PSCCH including the SA and the parameter used for a DMRS are as follows.

TABLE 5

| | Scrambling | | | | DMRS base sequence | | | | |
|---|---|---|---|---|---|---|---|---|---|
| | Cell ID | RNTI | Slot number | Codeword index | Group hopping | Sequence hopping | Delta shift | Cell ID | DMRS CS OCC |
| Discovery signal | 510 | Fixed to 0 regardless of UE ID | Fixed to 0 regardless of UE ID | Fixed to 0 | Disable | Disable | 0 | 510 | 0 [1 1] fixed |
| Scheduling Assignment (SA) | 510 | Fixed to 0 regardless of UE ID | Fixed to 0 regardless of UE ID | Fixed to 0 | Disable | Disable | 0 | 510 | 0 [1 1] fixed |
| Data | 510 | SA ID | | Fixed to 0 | Enable | Enable | 0 | 510 | Bit 1, 2, 3 Bit 0 |

Meanwhile, the UE#2 100-2 demodulates a PSDCH including the discovery signal based on the DMRS, receives a PSCCH based on the discovery signal, then readouts the received data through the PSSCH. And then only, the UE#2

100-2 becomes able to know whether the UE#1 100-1 is located in the coverage of a base station or outside the coverage, and in the case that the UE#1 100-1 is located in the coverage of a base station, whether the UE#1 100-1 is able to relay a D2D communication to the base station.

As such, considerable time is required until the UE#2 100-2 is able to know whether the UE#1 100-1 is located in the coverage of a base station and whether the UE#1 100-1 is able to relay a D2D communication to the base station.

Meanwhile, although it is not shown, the UE#2 100-2 is also able to transmit a discovery signal, a PSCCH including the SA and a PSSCH including data to the UE#1 100-1. In this case, although the UE#1 100-1 is located in the coverage of a base station and able to relay a D2D communication to the base station, the UE#1 100-1 becomes able to know whether the UE#2 100-2 is located outside the coverage of a base station. And then only, the UE#1 100-1 becomes able to know whether the UE#2 100-2 is located outside the coverage, and then, the UE#1 100-1 may determine that the UE#1 100-1 itself may operate as a relay for the UE#2 100-2. As such, considerable time is required until the UE#1 100-1 is able to know whether the UE#2 100-2 is able to relay a D2D communication to the base station.

Disclosure of the Present Specification

Accordingly, the disclosures of the present specification have been made in an effort to solve the problem. That is, the disclosures of the present specification have been made to propose a method for efficiently identifying that a neighboring UE is located in the coverage of a base station in a D2D environment, and identifying whether the UE is operable as a relay in the case that the UE is located in the coverage of a base station. In addition, the disclosures of the present specification have been made to propose a method for determining whether a UE located in the coverage of a base station is operable as a relay that relays a D2D communication to the base station, quickly and efficiently.

In order to attain the object described above, a first disclosure of the present specification is to propose a method for quickly identifying whether a neighboring UE is in the coverage or out of the coverage through one of a discovery signal and a DMRS. For example, when the UE#2 100-2 is located out of the coverage, in the case that the UE#2 100-2 knows that the UE#1 100-1 is in the coverage through one of a discovery signal and a DMRS received from the UE#1 100-1, the UE#2 100-2 may request the UE#1 100-1 to perform a role of relay. In addition, when the UE#1 100-1 is located in the coverage, in the case that the UE#1 100-1 knows that the UE#2 100-2 is out of the coverage through one of a discovery signal received from the UE#2 100-2, the UE#1 100-1 may report that the UE#2 100-2 is discovered located out of the coverage to the base station, and may report that the UE#1 100-1 may play the role of relay for UE#2 100-2.

In addition, in order to attain the object described above, a second disclosure of the present specification is to propose a method for quickly identifying whether a neighboring UE is in the coverage of a base station and able to operate as a relay through one of a discovery signal and a DMRS.

I. First Disclosure: Method for Distinguishing a UE Located in Coverage and a UE Located Outside Coverage A first disclosure of the present specification is to propose a method for quickly identifying whether a neighboring UE is in the coverage or out of the coverage through one of a discovery signal and a DMRS.

I-1. First Method of the First Disclosure: Distinguishing Method Using a Scrambling Sequence As described above, the scrambling sequence used for scrambling a PSDCH is generated as represented in Equation 8, and a generator of the scrambling sequence is initialized as $C_{init}=510$ as represented in Table 5.

However, the first method proposes that a generator of the scrambling sequence is initialized by the following $C_{init}$.

$$c_{init}=n_{RNTI} \cdot 2^{14}+q \cdot 2^{13}+\lfloor n_s/2 \rfloor \cdot 2^9+N_{ID}^{cell} \qquad \text{[Equation 14]}$$

Here, $N^{cell}_{ID}$ represents a cell ID, $n_s$ represents a slot number, q represents an index of a codeword number and $n_{RNTI}$ represents a radio network temporary identifier (RNTI).

Accordingly, the first method proposes to distinguish a UE in the coverage or a UE out of the coverage through a combination of one or more parameters among i) cell ID, ii) RNTI, iii) slot number iv) codeword number index.

Detailed embodiments for the parameters used in initializing the scramble sequence are described as below.

Conventionally, using the RNTI, it is configured that all UEs are to have 0 as the RNTI as represented in Table 5. However, in a first exemplary embodiment, it is configured that the RNTI of a UE located in the coverage (in coverage UE) and the RNTI of a UE located out of the coverage (out coverage UE) have different values. That is, between a and b, which are predetermined different values (herein, a,b∈{0, 1, ..., $2^{16}$–1}), the UE located in the coverage (in coverage UE) is configured to use the RNTI of value a, and the UE located out of the coverage (out coverage UE) is configured to use the RNTI of value b. As a particular example, it may be configured that the RNTI of the UE located in the coverage (in coverage UE) is to have 0 and the RNTI of the UE located out of the coverage (out coverage UE) is to have 1. Otherwise, on the contrary, it may also be configured that the RNTI of the UE located in the coverage (in coverage UE) is to have 1 and the RNTI of the UE located out of the coverage (out coverage UE) is to have 0.

Conventionally, using the slot number, it is configured that all UEs are to have 0 as the slot number as represented in Table 5. However, in a second exemplary embodiment, it is proposed that the slot number of a UE located in the coverage (in coverage UE) and the slot number of a UE located out of the coverage (out coverage UE) have different values. That is, between a and b, which are predetermined different values (herein a,b∈{0, 1, ... 19}), the UE located in the coverage (in coverage UE) is configured to use the slot number of value a, and the UE located out of the coverage (out coverage UE) is configured to use the slot number of value b. As a particular example, it may be configured that the slot number of the UE located in the coverage (in coverage UE) is to have 0 and the slot number of the UE located out of the coverage (out coverage UE) is to have 1. Otherwise, on the contrary, it may also be configured that the slot number of the UE located in the coverage (in coverage UE) is to have 1 and the slot number of the UE located out of the coverage (out coverage UE) is to have 0. As an additional example, when the slot number of the UE located in the coverage (in coverage UE) is not 0, the slot number of the UE located in the coverage (in coverage UE) is configured to use the current D2D slot number value and the slot number of the UE located out of the coverage (out coverage UE) is configured to have 0. Otherwise, when the slot number of the UE located in the coverage (in coverage UE) is 0, the slot number of the UE located in the coverage (in coverage UE) is configured to have 0 and slot number of the UE located out of the coverage (out coverage UE) is configured to use the current D2D slot number value.

Conventionally, using the codeword number index, it is configured that all UEs are to have 0 as the codeword number index as represented in Table 5. However, in a third exemplary embodiment, it is proposed that the codeword number index of a UE located in the coverage (in coverage UE) and the codeword number index of a UE located out of the coverage (out coverage UE) have different values. That is, between a and b, which are predetermined different values (herein a,b ∈{0,1}), the UE located in the coverage (in coverage UE) is configured to use the codeword number index of value a, and the UE located out of the coverage (out coverage UE) is configured to use the codeword number index of value b. As a particular example, it may be configured that the codeword number index of the UE located in the coverage (in coverage UE) is to have 0 and the codeword number index of the UE located out of the coverage (out coverage UE) is to have 1. Otherwise, on the contrary, it may also be configured that the codeword number index of the UE located in the coverage (in coverage UE) is to have 1 and the codeword number index of the UE located out of the coverage (out coverage UE) is to have 0.

As a fourth exemplary embodiment, a UE located in the coverage (in coverage UE) and a UE located out of the coverage (out coverage UE) may be distinguished using two or more combination among the cell ID, RNTI, slot number and codeword number index. That is, between a and b, which are predetermined different values (herein a,b ∈{0, 1, . . . , $2^8$–1}) and between c and d, which are predetermined different values (herein, c,d∈{0, 1, . . . , $2^{16}$–1}), the UE located in the coverage (in coverage UE) is configured to use the cell ID of value a and the RNTI of value c, and the UE located out of the coverage (out coverage UE) is configured to use the cell ID of value b and the RNTI of value d. As a particular example, it may be configured that the UE located in the coverage (in coverage UE) is to have 510 as the cell ID of and 0 as the RNTI, and the UE located out of the coverage (out coverage UE) is to have 511 as the cell ID and 1 as the RNTI. On the contrary, it may be configured that the UE located in the coverage (in coverage UE) is to have 511 as the cell ID of and 1 as the RNTI, and the UE located out of the coverage (out coverage UE) is to have 510 as the cell ID and 0 as the RNTI.

I-2. Second Method of the First Disclosure: Distinguishing Method Using a DMRS Base Sequence As described above, the DMRS used in a D2D communication (e.g., PSDCH, PSSCH, etc.) is generated in the same way of the DMRS of a PUSCH. That is, the DMRS used in a D2D communication (e.g., PSDCH, PSSCH, etc.) is generated in the same way of the DMRS for the PUSCH described using Equation 1 to Equation 12, and may be mapped to a symbol in a subframe as shown in FIG. 6 and FIG. 6b. Here, variables considered when a base sequence of the DMRS is generated are i) sequence hopping, ii) group hopping, iii) delta shift, and iv) cell ID. In the DMRS for a D2D communication (e.g., PSDCH, PSSCH, etc.), the variables represented in Table 5 are used, which are different from the DMRS of a PUSCH.

However, a second method proposes to distinguish a UE in the coverage and a UE out of the coverage by configuring one or more of the variables i) to iv) different from those of Table 5.

Detailed embodiments for a method for distinguishing a UE in the coverage and a UE out of the coverage using one or more of the variables i) to iv) are described as below.

As a first exemplary embodiment, the sequence hopping may be used. As it can be know with reference to Table 5, conventionally, all UEs are configured such that the sequence hopping is disabled. That is, in Equation 9, it is configured that the base sequence number defined as v is to have 0. However, in the first embodiment, it is proposed that the base sequence number of a UE located in the coverage (in coverage UE) and the base sequence number of a UE located out of the coverage (out coverage UE) have different values. That is, between a and b, which are predetermined different values (herein, a,b∈{0,1}), the UE located in the coverage (in coverage UE) is configured to use the base sequence number of value a, and the UE located out of the coverage (out coverage UE) is configured to use the base sequence number of value b. As a particular example, it may be configured that the base sequence number of the UE located in the coverage (in coverage UE) is to have 0 and the base sequence number of the UE located out of the coverage (out coverage UE) is to have 1. Otherwise, on the contrary, it may also be configured that the base sequence number of the UE located in the coverage (in coverage UE) is to have 1 and the base sequence number of the UE located out of the coverage (out coverage UE) is to have 0.

Figure 10:
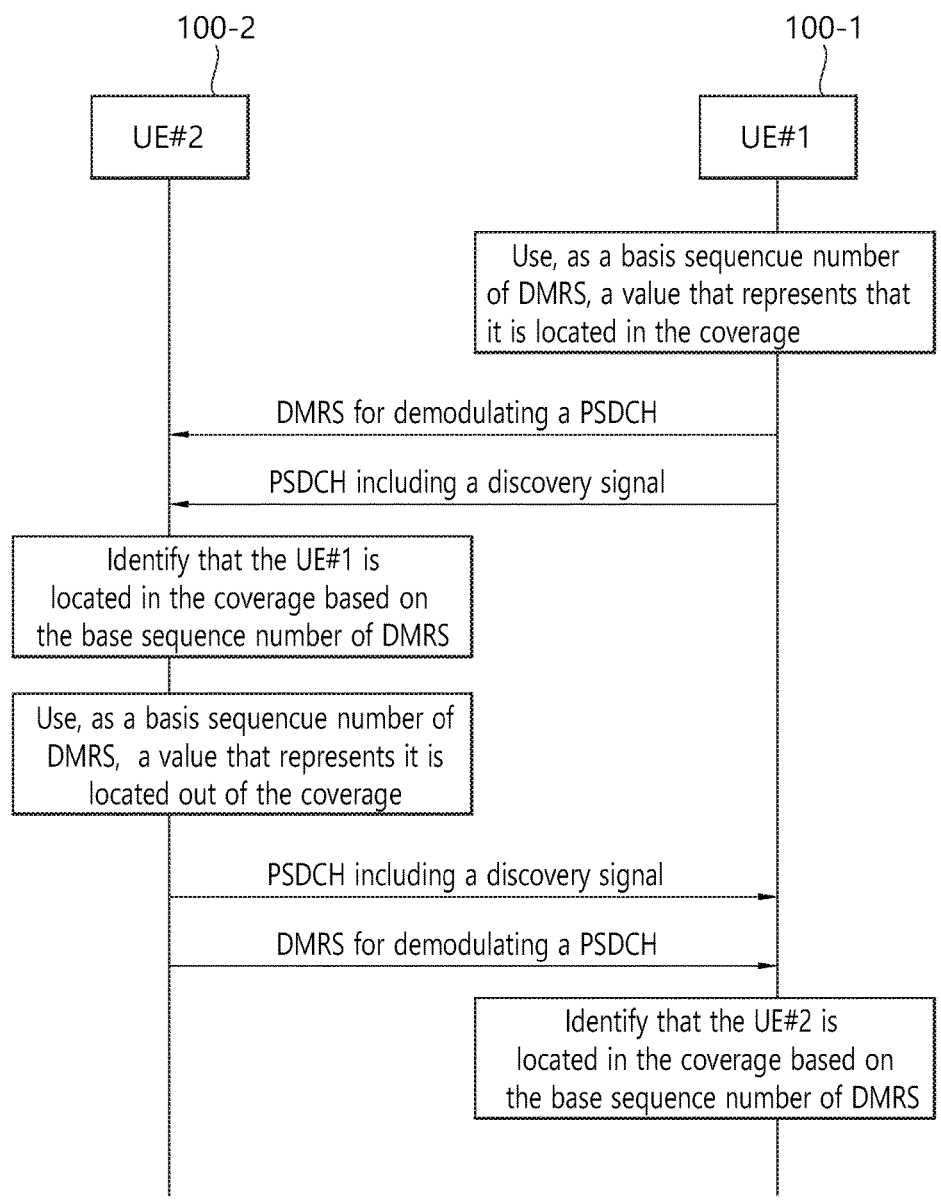
FIG. 10 is an exemplary diagram illustrating the first embodiment of the second method among the first disclosure of the present specification.

FIG. 10 is an exemplary diagram illustrating the first embodiment of the second method among the first disclosure of the present specification.

As it can be known with reference to FIG. 10, the UE#1 100-1 generates a DMRS using a value that represents it is located in the coverage, which is a base sequence number of the DMRS for demodulating a PSDCH. Subsequently, the UE#1 100-1 transmits a PDSCH including a discovery signal and the DMRS for demodulating a PSDCH. Then, the UE#2 100-2 perform a blind detection about what the base sequence number is, which is used in the DMRS received from the UE#1 100-1. And, the UE#2 100-2 may identify that the UE#1 100-1 is located in the coverage based on the base sequence number.

Similarly, the UE#2 100-2 generates a DMRS using a value that represents it is located out of the coverage, which is a base sequence number of the DMRS for demodulating a PSDCH. Subsequently, the UE#2 100-2 transmits a PDSCH including a discovery signal and the DMRS for demodulating a PSDCH. Then, the UE#1 100-1 perform a blind detection about what the base sequence number is, which is used in the DMRS received from the UE#2 100-2. And, the UE#1 100-1 may identify that the UE#2 100-2 is located out of the coverage based on the base sequence number.

In FIG. 10, it is shown that the PSDCH and the DMRS for demodulating the PSDCH are separately transmitted, but this is just for the convenience of creating the drawing. The PSDCH and the DMRS may be transmitted on a single D2D subframe.

Meanwhile, a second exemplary embodiment is described below. The second exemplary embodiment may use the combination of the ii) group hopping, iii) delta shift and iv) cell ID. Conventionally, it is configured that the group hopping of all UEs are disabled as represented in Table 5. It may be identified that the sequence group number defined as u in Equation 6 is determined as the group hopping pattern defined as $f_{gh}(n_s)$ and the sequence shift pattern defined as $f_{ss}$. Among these, it may be identified that a value of the sequence shift pattern is configured by the cell ID and the delta shift. Accordingly, when the cell ID and the delta shift have fixed values, a value of the sequence group number is configured as the group hopping pattern only. Therefore, according to the second embodiment, it is configured that a UE located in the coverage (in coverage UE) and a UE located out of the coverage (out coverage UE) have different group hopping patterns, or a UE located in the coverage (in coverage UE) and a UE located out of the coverage (out coverage UE) have element values of different set between two sets in which the same group hopping pattern is not shared. That is, between a and b, which are predetermined different values (herein, a,b∈{0, 1, . . . , 29}), the UE located in the coverage (in coverage UE) is configured to have value a as the group hopping pattern, and the UE located out of the coverage (out coverage UE) is configured to have value b as the group hopping pattern. Or, between A and B, which are predetermined sets (herein, A∪B={0, 1, . . . , 29} and, A∩B=ø), the UE located in the coverage (in coverage UE) is configured to have one of the elements in set A as the group hopping pattern, and the UE located out of the coverage (out coverage UE) is configured to have one of the elements in set B as the group hopping pattern. As a particular example, it may be configured that the group hopping pattern of the UE located in the coverage (in coverage UE) is to have 0 and the group hopping pattern of the UE located out of the coverage (out coverage UE) is to have 15. Otherwise, on the contrary, it may also be configured that the group hopping pattern of the UE located in the coverage (in coverage UE) is to have 15 and the group hopping pattern of the UE located out of the coverage (out coverage UE) is to have 0. As another example, by configuring that a set of the group hopping patterns from 0 to 14 as A and a set of the group hopping patterns from 15 to 29 as B, it may be configured that the UE located in the coverage (in coverage UE) is to have one of the elements in set A as the group hopping pattern, and the UE located out of the coverage (out coverage UE) is to have one of the elements in set B as the group hopping pattern. On the contrary, it may be configured that the UE located in the coverage (in coverage UE) is to have one of the elements in set B as the group hopping pattern, and the UE located out of the coverage (out coverage UE) is to have one of the elements in set A as the group hopping pattern.

As a third exemplary embodiment, the delta shift value may be used. Accordingly, when the group hopping pattern and the cell ID have fixed values, a value of the sequence group number is configured as the delta shift only. According to the content proposed herein, it is configured that a UE located in the coverage (in coverage UE) and a UE located out of the coverage (out coverage UE) have different delta shifts, or a UE located in the coverage (in coverage UE) and a UE located out of the coverage (out coverage UE) have element values of different set between two sets in which the same delta shift is not shared. That is, between a and b, which are predetermined different values (herein, a,b∈{0, 1, . . . , 29}), the UE located in the coverage (in coverage UE) is configured to have value a as the delta shift, and the UE located out of the coverage (out coverage UE) is configured to have value b as the delta shift. Or, between A and B, which are predetermined sets (herein, A∪B={0, 1, . . . , 29} and, A∩B=ø), the UE located in the coverage (in coverage UE) is configured to have one of the elements in set A as the delta shift, and the UE located out of the coverage (out coverage UE) is to have one of the elements in set B as the delta shift. As a particular example, it may be configured that the delta shift of the UE located in the coverage (in coverage UE) is to have 0 and the delta shift of the UE located out of the coverage (out coverage UE) is to have 15. On the contrary, it may also be configured that the delta shift of the UE located in the coverage (in coverage UE) is to have 15 and the delta shift of the UE located out of the coverage (out coverage UE) is to have 0. As another example, by configuring that a set of the delta shifts from 0 to 14 as A and a set of the delta shifts from 15 to 29 as B, it may be configured that the UE located in the coverage (in coverage UE) is to have one of the elements in set A as the delta shift, and the UE located out of the coverage (out coverage UE) is to have one of the elements in set B as the delta shift. On the contrary, it may be configured that the UE located in the coverage (in coverage UE) is to have one of the elements in set B as the delta shift, and the UE located out of the coverage (out coverage UE) is to have one of the elements in set A as the delta shift.

As a fourth exemplary embodiment, two or more combination among the variables i) to iv) may be used. That is, between a and b, which are predetermined different values (herein a,b ∈{0, 1, . . . , 29}) and between c and d, which are predetermined different values (herein, c,d∈{0, 1, . . . , 29}), the UE located in the coverage (in coverage UE) is configured to have value a as the group hopping pattern, and to have value c as the delta shift, and the UE located out of the coverage (in coverage UE) is configured to have value b as the group hopping pattern, and to have value d as the delta shift. As a particular example, it may be configured that the UE located in the coverage (in coverage UE) is to have 0 as the group hopping pattern and 0 as the delta shift, and the UE located out of the coverage (out coverage UE) is to have 15 as the grope hopping pattern and 15 as the delta shift. On the contrary, it may be configured that the UE located in the coverage (in coverage UE) is to have 15 as the group hopping pattern and 15 as the delta shift, and the UE located out of the coverage (out coverage UE) is to have 0 as the grope hopping pattern and 0 as the delta shift.

I-3. Third Method of the First Disclosure: Distinguishing Method Using a DMRS

As represented in Table 5, conventionally, 0 is applied for the cyclic shift (CS) for a DMRS and [1, 1] is used for an orthogonal cover code (OCC). However, a third method proposes a way to distinguish a UE located in the coverage from a UE located out of the coverage by differently configuring one or more of the CS and the OCC from Table 5.

As a first exemplary embodiment, the CS may be used. As represented in Table 5, conventionally, all UEs are configured to have the same CS value, 0. However, in the first embodiment, it is proposed that the CS of a UE located in the coverage (in coverage UE) and the CS of a UE located out of the coverage (out coverage UE) have different values. That is, between a and b, which are predetermined different values $$\left(\text{herein, } a, b \in \left\{0, \frac{\pi}{6}, \ldots, \frac{11\pi}{6}\right\}\right),$$

the UE located in the coverage (in coverage UE) is configured to have value a as the CS, and the UE located out of the coverage (out coverage UE) is configured to have value b as the CS. As a particular example, it may be configured that the CS of the UE located in the coverage (in coverage UE) is to have 0 and the CS of the UE located out of the coverage (out coverage UE) is to have π. On the contrary, it may be configured that the CS of the UE located in the coverage (in coverage UE) is to have π and the CS of the UE located out of the coverage (out coverage UE) is to have 0.

As a second exemplary embodiment, the OCC may be used. As represented in Table 5, conventionally, all UEs are configured to have the same OCC value, [1 1]. However, in the second embodiment, it is configured that the OCC of a UE located in the coverage (in coverage UE) and the OCC of a UE located out of the coverage (out coverage UE) have different values. That is, between a and b, which are predetermined different values (herein, a,b∈{[1 1], [1 −1], [−1 1], [−1 −1]}), the UE located in the coverage (in coverage UE) is configured to have value a as the OCC, and the UE located out of the coverage (out coverage UE) is configured to have value b as the OCC. As a particular example, it may be configured that the OCC of the UE located in the coverage (in coverage UE) is to have [1 1] and the OCC of the UE located out of the coverage (out coverage UE) is to have [1 −1]. On the contrary, it may be configured that the OCC of the UE located in the coverage (in coverage UE) is to have [1 −1] and the OCC of the UE located out of the coverage (out coverage UE) is to have [1 1].

As a third exemplary embodiment, using the combination of the CS and the OCC, a UE located in the coverage (in coverage UE) and a UE located out of the coverage (out coverage UE) may be distinguished. That is, between a and b, which are predetermined different values $$\left(\text{herein } a, b \in \left\{0, \frac{\pi}{6}, \ldots, \frac{11\pi}{6}\right\}\right)$$

and between c and d, which are predetermined different values (herein, c,d∈{[1 1], [1 −1], [−1 1], [−1 −1]}), the UE located in the coverage (in coverage UE) is configured to have value a as the CS, and to have value c as the OCC, and the UE located out of the coverage (in coverage UE) is configured to have value b as the CS, and to have value d as the OCC. As a particular example, it may be configured that the UE located in the coverage (in coverage UE) is to have 0 as the CS and {1 1} as the OCC, and the UE located out of the coverage (out coverage UE) is to have π as the CS and [1 −1] as the OCC. On the contrary, it may be configured that the UE located in the coverage (in coverage UE) is to have π as the CS and [1 −1] as the OCC, and the UE located out of the coverage (out coverage UE) is to have 0 as the CS and [1 1] as the OCC.

I-4. Fourth Method of the First Disclosure: Distinguishing Method Using a CRC Mask The conventional CRC mask is mainly used for distinguishing DCIs for each of UEs when a base station transmits a control signal. Similarly, the fourth method proposes a way to use the CRC mask for distinguishing a UE located in the coverage (in coverage UE) and a UE located out of the coverage (out coverage UE). According to the method proposed herein, by masking the CRC of the UE located in the coverage (in coverage UE) using an arbitrary value A for the UEs located in the coverage (in coverage UEs) and the CRC of the UE located out of the coverage (out coverage UE) using an arbitrary value B for the UEs located out of the coverage (out coverage UEs), the UE located in the coverage (in coverage UE) and the UE located out of the coverage (out coverage UE) may be distinguished. Here, A and B may be preconfigured as the values known by all UEs and a base station, may be determined by a higher layer and notified to each UE in advance, or may be configured in other method. In this case, A and B may not have the same value but should be independent with each other. As a particular example, it may be configured that an arbitrary value A for the UE located in the coverage (in coverage UE) is to have 0 and an arbitrary value B for the UE located out of the coverage (out coverage UE) is to have 1. On the contrary, it may be configured that an arbitrary value A for the UE located in the coverage (in coverage UE) is to have 1 and an arbitrary value B for the UE located out of the coverage (out coverage UE) is to have 0.

II. Second Disclosure: Method for Distinguishing a UE that is Able to Operate as a Relay A second disclosure of the present specification is to propose a method for quickly identifying whether a neighboring UE is able to operate as a relay through one of a discovery signal and a DMRS.

According to particular methods, it may be identified that whether a neighboring UE is able to operate as a relay using one or more of total 10 parameters used in the first method to the fourth method of the first disclosure, that is, four parameters (cell ID, RNTI, slot number and codeword number) used for initializing a scrambling sequence, four variables (sequence hopping, group hopping, delta shift and cell ID) used for generating a base sequence of a DMRS, and two parameters (CS and OCC) that is applicable to a DMRS and a CRC mask.

As a first embodiment, it may be configured that among the UEs located in the coverage (in coverage UEs), a UE that is able to operate as a relay and a UE that is unable to operate as a relay have different values. Particularly, among a, b and c, which are predetermined different values (herein, a, b, c∈{0, 1, 2, . . . , $2^{16}$−1}), among the UEs located in the coverage (in coverage UEs), the UE that is able to operate as a relay is configured to have value a as the RNTI, the UE that is unable to operate as a relay is configured to have value b as the RNTI, and the UE located out of the coverage (out coverage UE) is configured to have value c as the RNTI. As a particular example, it may be configured that among the UEs located in the coverage (in coverage UEs), the UE that is able to operate as a relay is to have 0 as the RNTI, and the UE that is unable to operate as a relay is configured to have value 1 as the RNTI. On the contrary, it may be configured that among the UEs located in the coverage (in coverage UEs), the UE that is able to operate as a relay is to have 1 as the RNTI, and the UE that is unable to operate as a relay is configured to have value 0 as the RNTI. Of course, the UE located out of the coverage (out coverage UE) is configured to have a value other than 0 and 1 as the RNTI. In this case, the UE located out of the coverage (out coverage UE) may be configured to have value 2 as the RNTI.

Figure 11:
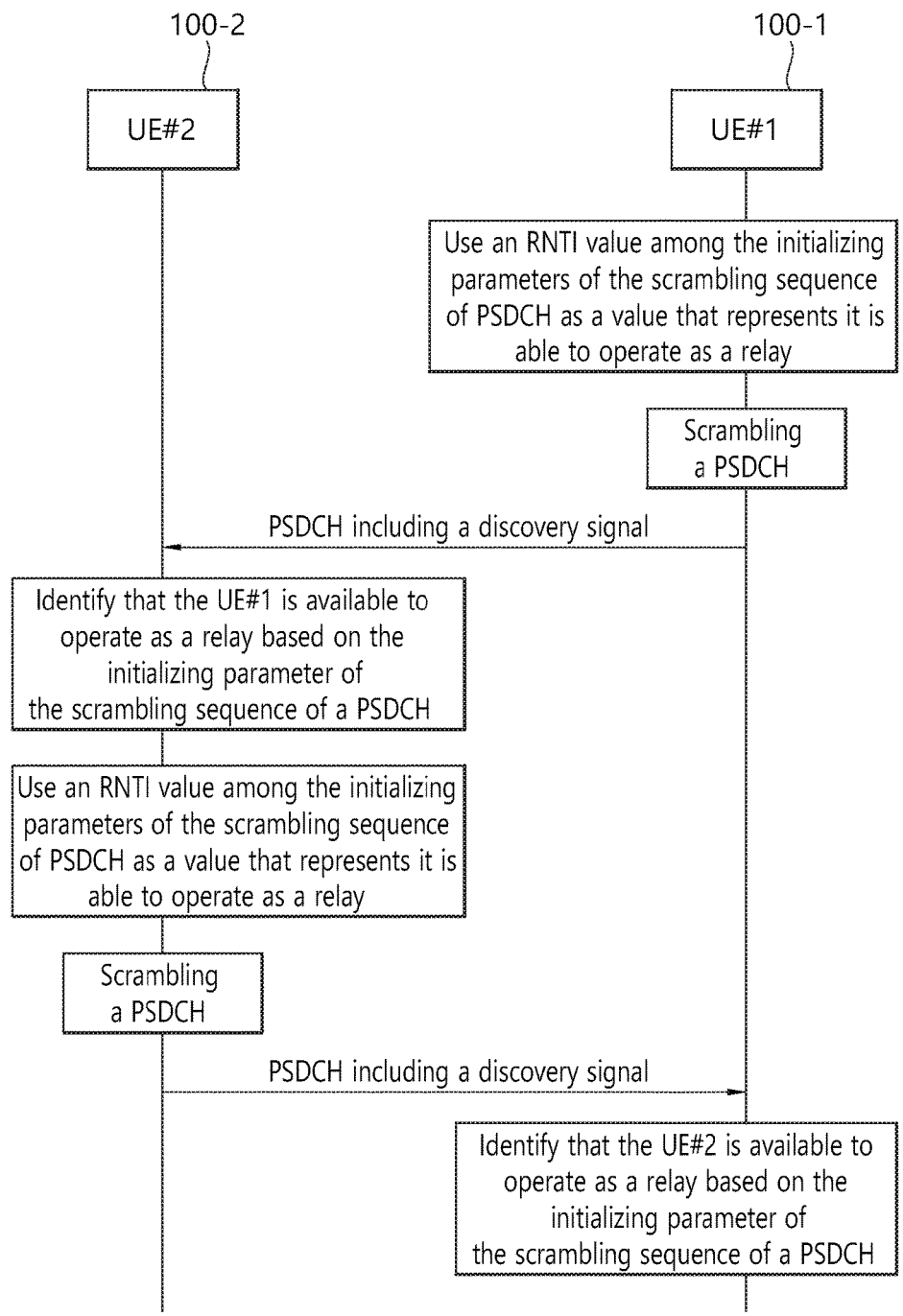
FIG. 11 is an exemplary diagram illustrating the first embodiment of the second disclosure of the present specification.

FIG. 11 is an exemplary diagram illustrating the first embodiment of the second disclosure of the present specification.

As it can be known with reference to FIG. 11, the UE#1 100-1 uses an RNTI value among the initializing parameters of the scrambling sequence as a value that represents it is able to operate as a relay. And, after initializing the scrambling sequence using the initializing parameter including the RNTI, the UE#1 100-1 scrambles a PDSCH according to the scrambling sequence. Subsequently, the UE#1 100-1 transmits a PDSCH including a discovery signal.

Then, the UE#2 100-2 perform a blind detection about what the scrambling sequence is, which is used in the PDSCH received from the UE#1 100-1. When the scrambling sequence is identified through the blind detection, it is able to know from which $C_{init}$ the scrambling sequence is initialized, and then, the RNTI value among the parameters used in $C_{init}$. Then, the UE#2 100-2 may identify that the UE#1 100-1 is available to operate as a relay based on the RNTI value.

Similarly, the UE#2 100-2 uses an RNTI value among the initializing parameters of the scrambling sequence as a value that represents it is unable to operate as a relay.

Meanwhile, a second exemplary embodiment is described below. According to the second embodiment, it may be distinguished whether the relay operation is available using a slot number. That is, among A, B and C, which are predetermined different sets (herein, A∪B∪C={0, 1 . . . , 19}, A∩B=Ø,B∩C=Ø,C∩A=Ø), among the UEs located in the coverage (in coverage UEs), the UE that is able to operate as a relay is configured to have value a as the RNTI, the UE that is unable to operate as a relay is configured to have one of the elements of set A as the slot number, and the UE that is unable to operate as a relay is configured to have one of the elements of set B as the slot number, and the UE located out of the coverage (out coverage UE) is configured to have one of the elements of set C as the slot number. As a particular example, it may be configured that among the UEs located in the coverage (in coverage UEs), the UE that is able to operate as a relay is to have [{(D2D slot number) mod 10}/2] as the slot number, the UE that is unable to operate as a relay is configured to have [{(D2D slot number) mod 10}/2]+1 as the slot number, and the UE located out of the coverage (out coverage UE) is configured to have (D2D slot number) mod 10+10 as the slot number.

As a third example, it may be distinguished whether the relay operation is available by differently configuring a cell ID. That is, between a and b, which are predetermined different values (herein, a,b∈{510,511}), the UE that is unable to operate as a relay is configured to have value a, and the UE that is able to operate as a relay is configured to have value b. As a particular example, it may be configured that the cell ID of the UE that is able to operate as a relay is to have 510 and the cell ID of the UE that is able to operate as a relay is to have 511. On the contrary, it may be configured that the cell ID of the UE that is able to operate as a relay is to have 511 and the cell ID of the UE that is able to operate as a relay is to have 510.

As a fourth example, it may be distinguished whether the relay operation is available by using a CRC mask. Similar to the fourth method of the first disclosure, by masking the CRC of the UE that is able to operate as a relay using value A and the CRC of the UE that is unable to operate as a relay using value B, it may be distinguished whether the relay operation is available for each UE. Here, A and B may be preconfigured as the values known by all UEs and a base station, may be determined by a higher layer and notified to each UE in advance, or may be configured in other method. In this case, A and B may not have the same value but should be independent with each other. As a particular example, it may be configured that value A for the UE located in the coverage (in coverage UE) is to have 0 and value B for the UE located out of the coverage (out coverage UE) is to have 1. On the contrary, it may be configured that value A for the UE located in the coverage (in coverage UE) is to have 1 and value B for the UE located out of the coverage (out coverage UE) is to have 0.

So far, four examples are described, but it is distinguished whether the relay operation is available by using other embodiments described in the first to fourth method of the first disclosure.

Meanwhile, as a fifth example, a UE that is able to operate as a relay and a UE that is unable to operate as a relay may be distinguished by using the combination of two or more of the ten parameters. As a particular example, when it is assumed that the cell ID used for the DMRS base sequence is fixed, it may be configured that different group hopping patterns and delta shifts are used for a UE that is able to operate as a relay and a UE that is unable to operate as a relay. As another example, among a, b and c, which are predetermined different values (herein, a,b,c∈{0, 1 . . . , 29}), and among d, e and f, which are predetermined different values (herein, d,e,f∈{0, 1, . . . , 29}), the UE that is able to operate as a relay is configured to have value a as the group hopping pattern and value d as the delta shift, the UE that is unable to operate as a relay is configured to have value b as the group hopping pattern and value e as the delta shift, and the UE located out of the coverage (out coverage UE) is configured to have value c as the group hopping pattern and value f as the delta shift. As a particular example for it, when it is assumed that the cell ID has a fixed value, it may be configured that among the UEs located in the coverage (in coverage UEs), the UE that is able to operate as a relay is to have 0 as the group hopping pattern and to have 0 as the delta shift, and the UE that is unable to operate as a relay is configured to have value 15 as the group hopping pattern and to have 15 as the delta shift. On the contrary, it may be configured that among the UEs located in the coverage (in coverage UEs), the UE that is able to operate as a relay is to have 15 as the group hopping pattern and to have 15 as the delta shift, the UE that is unable to operate as a relay is configured to have value 0 as the group hopping pattern and to have 0 as the delta shift, and the UE located out of the coverage (out coverage UE) is configured to have a value 1 as the group hopping pattern and to have 16 as the delta shift.

III. Third Disclosure: Combination of the First Disclosure and the Second Disclosure A third disclosure of the present specification proposes a combination of the first disclosure and the second disclosure described above. For example, a UE may indicate whether the UE itself is located in the coverage or out of the coverage using a base sequence number used for generating a DMRS for modulating a PSDCH including a discovery signal according to the second method of the first disclosure. Subsequently, a UE may indicate whether the UE itself is able to operate as a relay using an initializing parameter value of the scrambling sequence used for scrambling a PSDCH including a discovery signal according to the first embodiment of the second disclosure. Such an exemplary combination is described with reference to FIG. 12 below.

Figure 12:
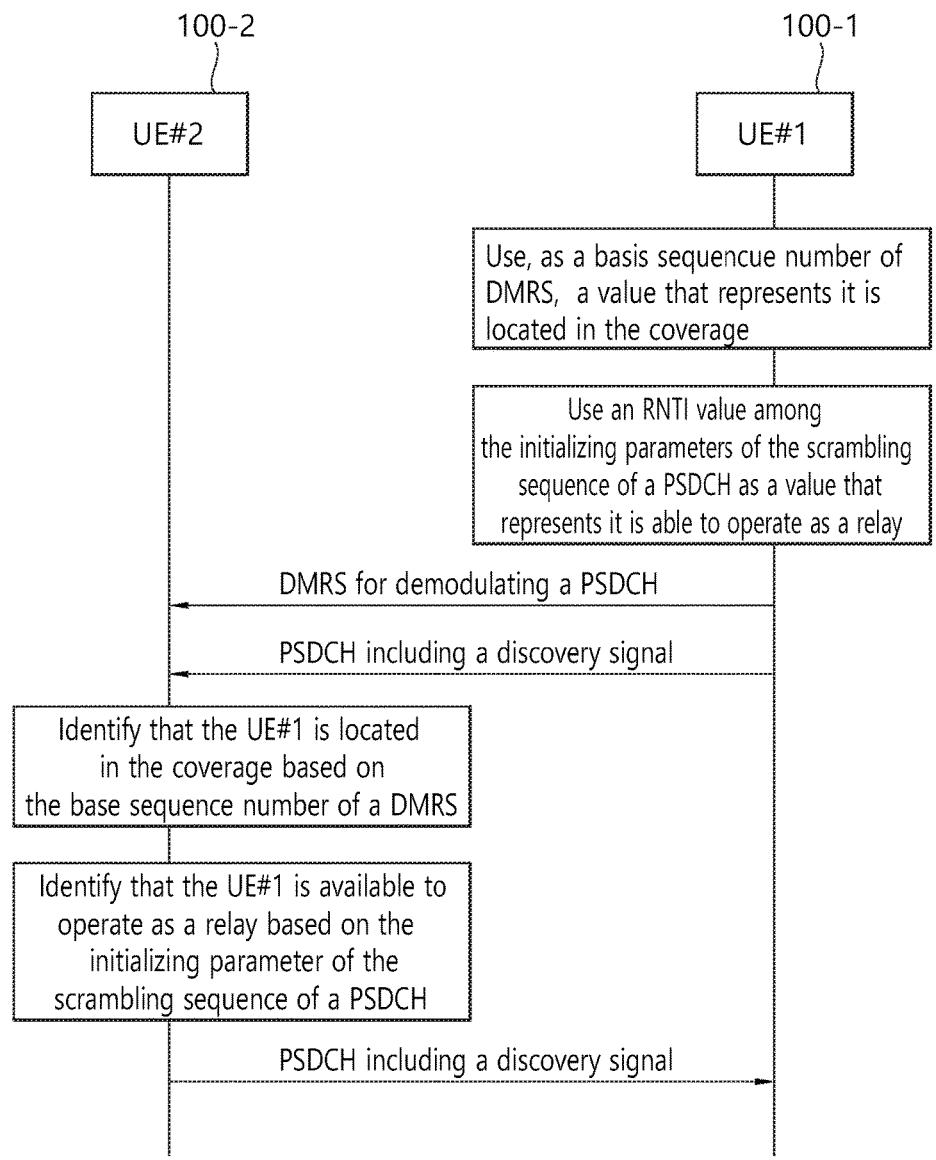
FIG. 12 is an exemplary diagram illustrating an example of the third disclosure of the present specification.

FIG. 12 is an exemplary diagram illustrating an example of the third disclosure of the present specification.

As it can be known with reference to FIG. 12, the UE#1 100-1 generates a DMRS using a value representing that it is located in the coverage using a base sequence number for the DMRS for demodulating a PSDCH.

Next, the UE#1 100-1 uses a RNTI value among the initializing parameters of the scrambling sequence as a value representing that it is able to operate as a relay. And, after initializing the scrambling sequence using the initializing parameter including the RNTI, the UE#1 100-1 scrambles a PDSCH according to the scrambling sequence.

Subsequently, the UE#1 100-1 transmits a PDSCH including a discovery signal and the DMRS for demodulating a PSDCH.

Then, the UE#2 100-2 performs a blind detection about what the base sequence number is, which is used in the DMRS received from the UE#1 100-1. Then, the UE#2 100-2 may identify that the UE#1 100-1 is located in the coverage based on the base sequence number.

In addition, the UE#2 100-2 may identify that the UE#1 100-1 is able to operate as a relay based on the RNTI value.

Meanwhile, the UE#2 100-2 may also receive a DMRS and a PSDCH from neighboring UE#3 100-3 shown in FIG. 7 as described above. And, the UE#2 100-2 may identify that the neighboring UE#3 100-3 is located in the coverage or out of the coverage and is able to operate as a relay through the DMRS and the PSDCH.

The UE#2 100-2 may select either one of the UE#1 100-1 and the UE#3 100-3. Here, since the UE#3 100-3 is located out of the coverage of a base station as shown in FIG. 7, the UE#2 100-2 may select the UE#1 100-1 as a relay.

In FIG. 12, it is shown that the PSDCH and the DMRS for demodulating the PDSCH are separately transmitted. However, this is just for the convenience of creating the drawing, and the PSDCH and the DMRS may be transmitted on a single D2D subframe.

IV. Fourth Disclosure: Efficient Method for Utilizing Radio Resource Through the First Disclosure and the Second Disclosure In the conventional LTE D2D environment, in order for a relay communication between a UE located out of the coverage (out coverage UE) and a UE operable as a relay while being located in the coverage to be activated, after a PSCCH is decoded using information obtained through a discovery signal and a PSSCH is received on a plurality of resources indicated by a scheduling assignment (SA) included in the PSCCH, data are extracted by decoding the PSSCH, and then, the information in relation to the relay communication should be obtained through the data. Accordingly, considerable times are required.

Meanwhile, according to the first disclosure, the second disclosure and the third disclosure, a UE located out of the coverage (out coverage UE) may quickly identify that a neighboring UE is located in the coverage and the corresponding neighboring UE is able to operate as a relay.

However, as such, in the case that the UE located out of the coverage (out coverage UE) quickly identifies the neighboring UE operable as a relay in the coverage, and then, directly starts a D2D data communication, the radio resource may be collided.

Accordingly, a fourth disclosure of the present specification proposes an efficient method for utilizing radio resource when a UE located out of the coverage (out coverage UE) is going to perform a D2D data communication with a neighboring UE operable as a relay in the coverage.

Figure 13:
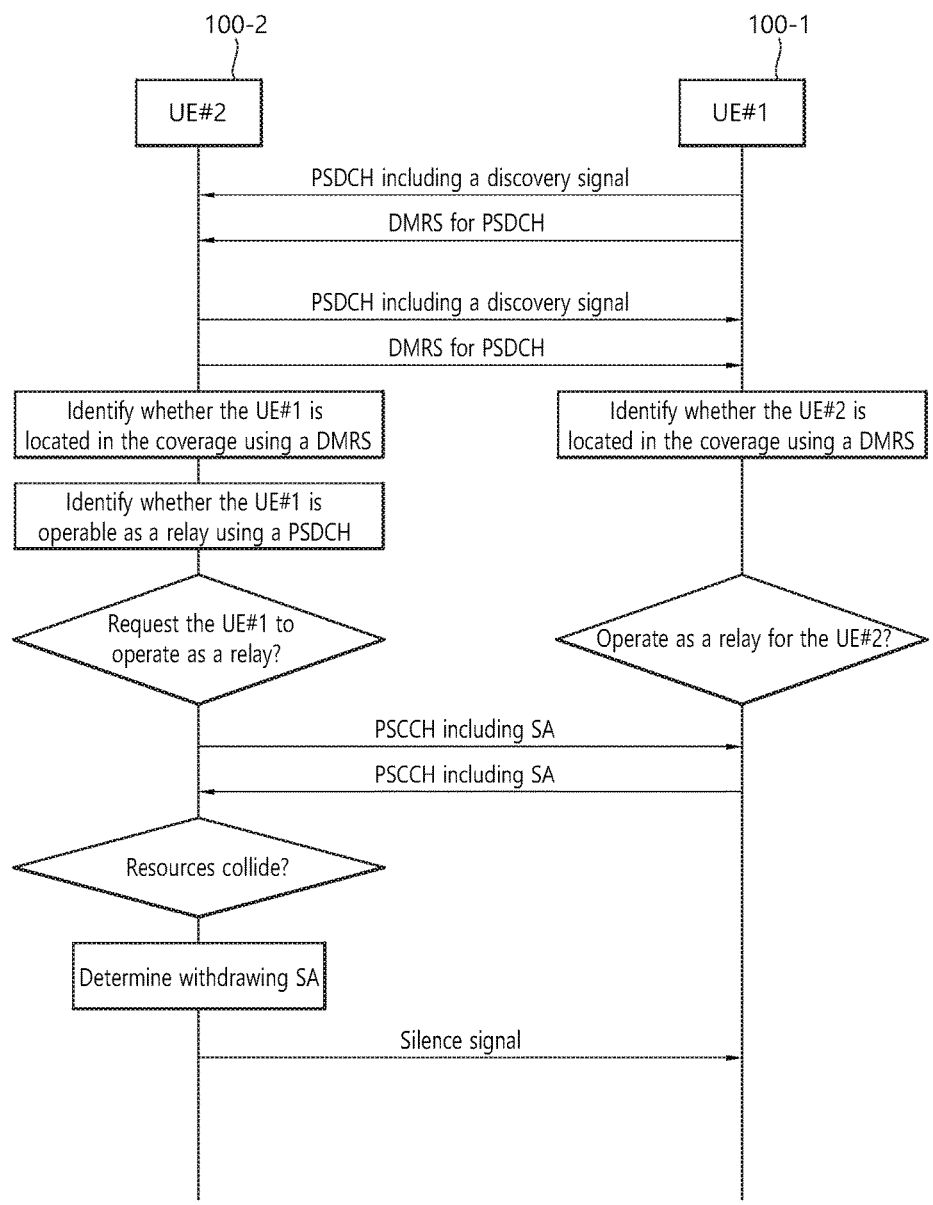
FIG. 13 is an exemplary diagram illustrating the fourth disclosure of the present specification.

FIG. 13 is an exemplary diagram illustrating the fourth disclosure of the present specification.

Referring to FIG. 13, the UE#1 100-1 transmits a PSDCH including a discovery signal and a DMRS for demodulating the PSDCH, and the UE#2 100-2 transmits a PSDCH including a discovery signal and a DMRS for demodulating the PSDCH. In FIG. 13, it is shown that the PSDCH and the DMRS for demodulating the PDSCH are separately transmitted. However, this is just for the convenience of creating the drawing, and the PSDCH and the DMRS may be transmitted on a single D2D subframe.

The UE#1 100-1 identifies that the UE#2 100-2 is located out of the coverage using the DMRS from the UE#2 100-2. Later, since the UE#1 100-1 is located in the coverage and operable as a relay, the UE#1 100-1 determines to operate as a relay for the UE#2 100-2.

Meanwhile, the UE#2 100-2 identifies that the UE#1 100-1 is located in the coverage using the DMRS from the UE#1 100-1. In addition, the UE#2 100-2 identifies that the UE#1 100-1 is operable as a relay using the PSDCH including the discovery signal from the UE#1 100-1. And, the UE#2 100-2 determines to request the UE#1 100-1 to operate as a relay.

In order to transmit a message for requesting the UE#1 100-1 to operate as a relay, the UE#2 100-2 determines an SA and transmits a PSCCH including the determined SA.

Meanwhile, in the case that the UE#1 100-1 determines to operate as a relay for the UE#2 100-2, the UE#1 100-1 determines a scheduling assignment (SA) for notifying it and transmits the PSCCH including the determined SA.

The SA is performed by the determination of a time resource pattern of transmission (T-RPT). The T-RPT is determined as one field among Table 6, Table 7 and Table 8 below.

TABLE 6

| $I_{TRP}$ | $k_{TRP}$ | $(b'_0, b'_1, \ldots b'_{N_{TRP}-1})$ |
|---|---|---|
| 0 | 1 | (1, 0, 0, 0, 0, 0, 0, 0) |
| 1 | 1 | (0, 1, 0, 0, 0, 0, 0, 0) |
| 2 | 1 | (0, 0, 1, 0, 0, 0, 0, 0) |
| 3 | 1 | (0, 0, 0, 1, 0, 0, 0, 0) |
| 4 | 1 | (0, 0, 0, 0, 1, 0, 0, 0) |
| 5 | 1 | (0, 0, 0, 0, 0, 1, 0, 0) |
| 6 | 1 | (0, 0, 0, 0, 0, 0, 1, 0) |
| 7 | 1 | (0, 0, 0, 0, 0, 0, 0, 1) |
| 8 | 2 | (1, 1, 0, 0, 0, 0, 0, 0) |
| 9 | 2 | (1, 0, 1, 0, 0, 0, 0, 0) |
| 10 | 2 | (0, 1, 1, 0, 0, 0, 0, 0) |
| 11 | 2 | (1, 0, 0, 1, 0, 0, 0, 0) |
| 12 | 2 | (0, 1, 0, 1, 0, 0, 0, 0) |
| 13 | 2 | (0, 0, 1, 1, 0, 0, 0, 0) |
| 14 | 2 | (1, 0, 0, 0, 1, 0, 0, 0) |
| 15 | 2 | (0, 1, 0, 0, 1, 0, 0, 0) |
| 16 | 2 | (0, 0, 1, 0, 1, 0, 0, 0) |
| 17 | 2 | (0, 0, 0, 1, 1, 0, 0, 0) |
| 18 | 2 | (1, 0, 0, 0, 0, 1, 0, 0) |
| 19 | 2 | (0, 1, 0, 0, 0, 1, 0, 0) |
| 20 | 2 | (0, 0, 1, 0, 0, 1, 0, 0) |
| 21 | 2 | (0, 0, 0, 1, 0, 1, 0, 0) |
| 22 | 2 | (0, 0, 0, 0, 1, 1, 0, 0) |
| 23 | 2 | (1, 0, 0, 0, 0, 0, 1, 0) |
| 24 | 2 | (0, 1, 0, 0, 0, 0, 1, 0) |
| 25 | 2 | (0, 0, 1, 0, 0, 0, 1, 0) |
| 26 | 2 | (0, 0, 0, 1, 0, 0, 1, 0) |
| 27 | 2 | (0, 0, 0, 0, 1, 0, 1, 0) |
| 28 | 2 | (0, 0, 0, 0, 0, 1, 1, 0) |
| 29 | 2 | (1, 0, 0, 0, 0, 0, 0, 1) |
| 30 | 2 | (0, 1, 0, 0, 0, 0, 0, 1) |
| 31 | 2 | (0, 0, 1, 0, 0, 0, 0, 1) |
| 32 | 2 | (0, 0, 0, 1, 0, 0, 0, 1) |
| 33 | 2 | (0, 0, 0, 0, 1, 0, 0, 1) |
| 34 | 2 | (0, 0, 0, 0, 0, 1, 0, 1) |
| 35 | 2 | (0, 0, 0, 0, 0, 0, 1, 1) |
| 36 | 4 | (1, 1, 1, 1, 0, 0, 0, 0) |
| 37 | 4 | (1, 1, 1, 0, 1, 0, 0, 0) |
| 38 | 4 | (1, 1, 0, 1, 1, 0, 0, 0) |
| 39 | 4 | (1, 0, 1, 1, 1, 0, 0, 0) |
| 40 | 4 | (0, 1, 1, 1, 1, 0, 0, 0) |
| 41 | 4 | (1, 1, 1, 0, 0, 1, 0, 0) |
| 42 | 4 | (1, 1, 0, 1, 0, 1, 0, 0) |
| 43 | 4 | (1, 0, 1, 1, 0, 1, 0, 0) |
| 44 | 4 | (0, 1, 1, 1, 0, 1, 0, 0) |
| 45 | 4 | (1, 1, 0, 0, 1, 1, 0, 0) |
| 46 | 4 | (1, 0, 1, 0, 1, 1, 0, 0) |
| 47 | 4 | (0, 1, 1, 0, 1, 1, 0, 0) |
| 48 | 4 | (1, 0, 0, 1, 1, 1, 0, 0) |
| 49 | 4 | (0, 1, 0, 1, 1, 1, 0, 0) |
| 50 | 4 | (0, 0, 1, 1, 1, 1, 0, 0) |
| 51 | 4 | (1, 1, 1, 0, 0, 0, 1, 0) |
| 52 | 4 | (1, 1, 0, 1, 0, 0, 1, 0) |
| 53 | 4 | (1, 0, 1, 1, 0, 0, 1, 0) |
| 54 | 4 | (0, 1, 1, 1, 0, 0, 1, 0) |
| 55 | 4 | (1, 1, 0, 0, 1, 0, 1, 0) |
| 56 | 4 | (1, 0, 1, 0, 1, 0, 1, 0) |
| 57 | 4 | (0, 1, 1, 0, 1, 0, 1, 0) |
| 58 | 4 | (1, 0, 0, 1, 1, 0, 1, 0) |
| 59 | 4 | (0, 1, 0, 1, 1, 0, 1, 0) |
| 60 | 4 | (0, 0, 1, 1, 1, 0, 1, 0) |
| 61 | 4 | (1, 1, 0, 0, 0, 1, 1, 0) |
| 62 | 4 | (1, 0, 1, 0, 0, 1, 1, 0) |
| 63 | 4 | (0, 1, 1, 0, 0, 1, 1, 0) |
| 64 | 4 | (1, 0, 0, 1, 0, 1, 1, 0) |
| 65 | 4 | (0, 1, 0, 1, 0, 1, 1, 0) |
| 66 | 4 | (0, 0, 1, 1, 0, 1, 1, 0) |

TABLE 6-continued

| $I_{TRP}$ | $k_{TRP}$ | $(b'_0, b'_1, \ldots b'_{N_{TRP}-1})$ |
|---|---|---|
| 67 | 4 | (1, 0, 0, 0, 1, 1, 1, 0) |
| 68 | 4 | (0, 1, 0, 0, 1, 1, 1, 0) |
| 69 | 4 | (0, 0, 1, 0, 1, 1, 1, 0) |
| 70 | 4 | (0, 0, 0, 1, 1, 1, 1, 0) |
| 71 | 4 | (1, 1, 1, 0, 0, 0, 0, 1) |
| 72 | 4 | (1, 1, 0, 1, 0, 0, 0, 1) |
| 73 | 4 | (1, 0, 1, 1, 0, 0, 0, 1) |
| 74 | 4 | (0, 1, 1, 1, 0, 0, 0, 1) |
| 75 | 4 | (1, 1, 0, 0, 1, 0, 0, 1) |
| 76 | 4 | (1, 0, 1, 0, 1, 0, 0, 1) |
| 77 | 4 | (0, 1, 1, 0, 1, 0, 0, 1) |
| 78 | 4 | (1, 0, 0, 1, 1, 0, 0, 1) |
| 79 | 4 | (0, 1, 0, 1, 1, 0, 0, 1) |
| 80 | 4 | (0, 0, 1, 1, 1, 0, 0, 1) |
| 81 | 4 | (1, 1, 0, 0, 0, 1, 0, 1) |
| 82 | 4 | (1, 0, 1, 0, 0, 1, 0, 1) |
| 83 | 4 | (0, 1, 1, 0, 0, 1, 0, 1) |
| 84 | 4 | (1, 0, 0, 1, 0, 1, 0, 1) |
| 85 | 4 | (0, 1, 0, 1, 0, 1, 0, 1) |
| 86 | 4 | (0, 0, 1, 1, 0, 1, 0, 1) |
| 87 | 4 | (1, 0, 0, 0, 1, 1, 0, 1) |
| 88 | 4 | (0, 1, 0, 0, 1, 1, 0, 1) |
| 89 | 4 | (0, 0, 1, 0, 1, 1, 0, 1) |
| 90 | 4 | (0, 0, 0, 1, 1, 1, 0, 1) |
| 91 | 4 | (1, 1, 0, 0, 0, 0, 1, 1) |
| 92 | 4 | (1, 0, 1, 0, 0, 0, 1, 1) |
| 93 | 4 | (0, 1, 1, 0, 0, 0, 1, 1) |
| 94 | 4 | (1, 0, 0, 1, 0, 0, 1, 1) |
| 95 | 4 | (0, 1, 0, 1, 0, 0, 1, 1) |
| 96 | 4 | (0, 0, 1, 1, 0, 0, 1, 1) |
| 97 | 4 | (1, 0, 0, 0, 1, 0, 1, 1) |
| 98 | 4 | (0, 1, 0, 0, 1, 0, 1, 1) |
| 99 | 4 | (0, 0, 1, 0, 1, 0, 1, 1) |
| 100 | 4 | (0, 0, 0, 1, 1, 0, 1, 1) |
| 101 | 4 | (1, 0, 0, 0, 0, 1, 1, 1) |
| 102 | 4 | (0, 1, 0, 0, 0, 1, 1, 1) |
| 103 | 4 | (0, 0, 1, 0, 0, 1, 1, 1) |
| 104 | 4 | (0, 0, 0, 1, 0, 1, 1, 1) |
| 105 | 4 | (0, 0, 0, 0, 1, 1, 1, 1) |
| 106 | 8 | (1, 1, 1, 1, 1, 1, 1, 1) |
| 107-127 | reserved | reserved |

TABLE 7

| $I_{TRP}$ | $k_{TRP}$ | $(b'_0, b'_1, \ldots b'_{N_{TRP}-1})$ |
|---|---|---|
| 0 | reserved | reserved |
| 1 | 1 | (1, 0, 0, 0, 0, 0, 0) |
| 2 | 1 | (0, 1, 0, 0, 0, 0, 0) |
| 3 | 2 | (1, 1, 0, 0, 0, 0, 0) |
| 4 | 1 | (0, 0, 1, 0, 0, 0, 0) |
| 5 | 2 | (1, 0, 1, 0, 0, 0, 0) |
| 6 | 2 | (0, 1, 1, 0, 0, 0, 0) |
| 7 | 3 | (1, 1, 1, 0, 0, 0, 0) |
| 8 | 1 | (0, 0, 0, 1, 0, 0, 0) |
| 9 | 2 | (1, 0, 0, 1, 0, 0, 0) |
| 10 | 2 | (0, 1, 0, 1, 0, 0, 0) |
| 11 | 3 | (1, 1, 0, 1, 0, 0, 0) |
| 12 | 2 | (0, 0, 1, 1, 0, 0, 0) |
| 13 | 3 | (1, 0, 1, 1, 0, 0, 0) |
| 14 | 3 | (0, 1, 1, 1, 0, 0, 0) |
| 15 | 4 | (1, 1, 1, 1, 0, 0, 0) |
| 16 | 1 | (0, 0, 0, 0, 1, 0, 0) |
| 17 | 2 | (1, 0, 0, 0, 1, 0, 0) |
| 18 | 2 | (0, 1, 0, 0, 1, 0, 0) |
| 19 | 3 | (1, 1, 0, 0, 1, 0, 0) |
| 20 | 2 | (0, 0, 1, 0, 1, 0, 0) |
| 21 | 3 | (1, 0, 1, 0, 1, 0, 0) |
| 22 | 3 | (0, 1, 1, 0, 1, 0, 0) |
| 23 | 4 | (1, 1, 1, 0, 1, 0, 0) |
| 24 | 2 | (0, 0, 0, 1, 1, 0, 0) |
| 25 | 3 | (1, 0, 0, 1, 1, 0, 0) |
| 26 | 3 | (0, 1, 0, 1, 1, 0, 0) |
| 27 | 4 | (1, 1, 0, 1, 1, 0, 0) |
| 28 | 3 | (0, 0, 1, 1, 1, 0, 0) |

TABLE 7-continued

| $I_{TRP}$ | $k_{TRP}$ | $(b'_0, b'_1, \ldots b'_{N_{TRP}-1})$ |
|---|---|---|
| 29 | 4 | (1, 0, 1, 1, 1, 0, 0) |
| 30 | 4 | (0, 1, 1, 1, 1, 0, 0) |
| 31 | 5 | (1, 1, 1, 1, 1, 0, 0) |
| 32 | 1 | (0, 0, 0, 0, 0, 1, 0) |
| 33 | 2 | (1, 0, 0, 0, 0, 1, 0) |
| 34 | 2 | (0, 1, 0, 0, 0, 1, 0) |
| 35 | 3 | (1, 1, 0, 0, 0, 1, 0) |
| 36 | 2 | (0, 0, 1, 0, 0, 1, 0) |
| 37 | 3 | (1, 0, 1, 0, 0, 1, 0) |
| 38 | 3 | (0, 1, 1, 0, 0, 1, 0) |
| 39 | 4 | (1, 1, 1, 0, 0, 1, 0) |
| 40 | 2 | (0, 0, 0, 1, 0, 1, 0) |
| 41 | 3 | (1, 0, 0, 1, 0, 1, 0) |
| 42 | 3 | (0, 1, 0, 1, 0, 1, 0) |
| 43 | 4 | (1, 1, 0, 1, 0, 1, 0) |
| 44 | 3 | (0, 0, 1, 1, 0, 1, 0) |
| 45 | 4 | (1, 0, 1, 1, 0, 1, 0) |
| 46 | 4 | (0, 1, 1, 1, 0, 1, 0) |
| 47 | 5 | (1, 1, 1, 1, 0, 1, 0) |
| 48 | 2 | (0, 0, 0, 0, 1, 1, 0) |
| 49 | 3 | (1, 0, 0, 0, 1, 1, 0) |
| 50 | 3 | (0, 1, 0, 0, 1, 1, 0) |
| 51 | 4 | (1, 1, 0, 0, 1, 1, 0) |
| 52 | 3 | (0, 0, 1, 0, 1, 1, 0) |
| 53 | 4 | (1, 0, 1, 0, 1, 1, 0) |
| 54 | 4 | (0, 1, 1, 0, 1, 1, 0) |
| 55 | 5 | (1, 1, 1, 0, 1, 1, 0) |
| 56 | 3 | (0, 0, 0, 1, 1, 1, 0) |
| 57 | 4 | (1, 0, 0, 1, 1, 1, 0) |
| 58 | 4 | (0, 1, 0, 1, 1, 1, 0) |
| 59 | 5 | (1, 1, 0, 1, 1, 1, 0) |
| 60 | 4 | (0, 0, 1, 1, 1, 1, 0) |
| 61 | 5 | (1, 0, 1, 1, 1, 1, 0) |
| 62 | 5 | (0, 1, 1, 1, 1, 1, 0) |
| 63 | 6 | (1, 1, 1, 1, 1, 1, 0) |
| 64 | 1 | (0, 0, 0, 0, 0, 0, 1) |
| 65 | 2 | (1, 0, 0, 0, 0, 0, 1) |
| 66 | 2 | (0, 1, 0, 0, 0, 0, 1) |
| 67 | 3 | (1, 1, 0, 0, 0, 0, 1) |
| 68 | 2 | (0, 0, 1, 0, 0, 0, 1) |
| 69 | 3 | (1, 0, 1, 0, 0, 0, 1) |
| 70 | 3 | (0, 1, 1, 0, 0, 0, 1) |
| 71 | 4 | (1, 1, 1, 0, 0, 0, 1) |
| 72 | 2 | (0, 0, 0, 1, 0, 0, 1) |
| 73 | 3 | (1, 0, 0, 1, 0, 0, 1) |
| 74 | 3 | (0, 1, 0, 1, 0, 0, 1) |
| 75 | 4 | (1, 1, 0, 1, 0, 0, 1) |
| 76 | 3 | (0, 0, 1, 1, 0, 0, 1) |
| 77 | 4 | (1, 0, 1, 1, 0, 0, 1) |
| 78 | 4 | (0, 1, 1, 1, 0, 0, 1) |
| 79 | 5 | (1, 1, 1, 1, 0, 0, 1) |
| 80 | 2 | (0, 0, 0, 0, 1, 0, 1) |
| 81 | 3 | (1, 0, 0, 0, 1, 0, 1) |
| 82 | 3 | (0, 1, 0, 0, 1, 0, 1) |
| 83 | 4 | (1, 1, 0, 0, 1, 0, 1) |
| 84 | 3 | (0, 0, 1, 0, 1, 0, 1) |
| 85 | 4 | (1, 0, 1, 0, 1, 0, 1) |
| 86 | 4 | (0, 1, 1, 0, 1, 0, 1) |
| 87 | 5 | (1, 1, 1, 0, 1, 0, 1) |
| 88 | 3 | (0, 0, 0, 1, 1, 0, 1) |
| 89 | 4 | (1, 0, 0, 1, 1, 0, 1) |
| 90 | 4 | (0, 1, 0, 1, 1, 0, 1) |
| 91 | 5 | (1, 1, 0, 1, 1, 0, 1) |
| 92 | 4 | (0, 0, 1, 1, 1, 0, 1) |
| 93 | 5 | (1, 0, 1, 1, 1, 0, 1) |
| 94 | 5 | (0, 1, 1, 1, 1, 0, 1) |
| 95 | 6 | (1, 1, 1, 1, 1, 0, 1) |
| 96 | 2 | (0, 0, 0, 0, 0, 1, 1) |
| 97 | 3 | (1, 0, 0, 0, 0, 1, 1) |
| 98 | 3 | (0, 1, 0, 0, 0, 1, 1) |
| 99 | 4 | (1, 1, 0, 0, 0, 1, 1) |
| 100 | 3 | (0, 0, 1, 0, 0, 1, 1) |
| 101 | 4 | (1, 0, 1, 0, 0, 1, 1) |
| 102 | 4 | (0, 1, 1, 0, 0, 1, 1) |
| 103 | 5 | (1, 1, 1, 0, 0, 1, 1) |
| 104 | 3 | (0, 0, 0, 1, 0, 1, 1) |
| 105 | 4 | (1, 0, 0, 1, 0, 1, 1) |
| 106 | 4 | (0, 1, 0, 1, 0, 1, 1) |

TABLE 7-continued

| $I_{TRP}$ | $k_{TRP}$ | $(b'_0, b'_1, \ldots b'_{NTRP-1})$ |
|---|---|---|
| 107 | 5 | (1, 1, 0, 1, 0, 1, 1) |
| 108 | 4 | (0, 0, 1, 1, 0, 1, 1) |
| 109 | 5 | (1, 0, 1, 1, 0, 1, 1) |
| 110 | 5 | (0, 1, 1, 1, 0, 1, 1) |
| 111 | 6 | (1, 1, 1, 1, 0, 1, 1) |
| 112 | 3 | (0, 0, 0, 0, 1, 1, 1) |
| 113 | 4 | (1, 0, 0, 0, 1, 1, 1) |
| 114 | 4 | (0, 1, 0, 0, 1, 1, 1) |
| 115 | 5 | (1, 1, 0, 0, 1, 1, 1) |
| 116 | 4 | (0, 0, 1, 0, 1, 1, 1) |
| 117 | 5 | (1, 0, 1, 0, 1, 1, 1) |
| 118 | 5 | (0, 1, 1, 0, 1, 1, 1) |
| 119 | 6 | (1, 1, 1, 0, 1, 1, 1) |
| 120 | 4 | (0, 0, 0, 1, 1, 1, 1) |
| 121 | 5 | (1, 0, 0, 1, 1, 1, 1) |
| 122 | 5 | (0, 1, 0, 1, 1, 1, 1) |
| 123 | 6 | (1, 1, 0, 1, 1, 1, 1) |
| 124 | 5 | (0, 0, 1, 1, 1, 1, 1) |
| 125 | 6 | (1, 0, 1, 1, 1, 1, 1) |
| 126 | 6 | (0, 1, 1, 1, 1, 1, 1) |
| 127 | 7 | (1, 1, 1, 1, 1, 1, 1) |

TABLE 8

| $I_{TRP}$ | $k_{TRP}$ | $(b'_0, b'_1, \ldots b'_{NTRP-1})$ |
|---|---|---|
| 0 | reserved | reserved |
| 1 | 1 | (1, 0, 0, 0, 0, 0) |
| 2 | 1 | (0, 1, 0, 0, 0, 0) |
| 3 | 2 | (1, 1, 0, 0, 0, 0) |
| 4 | 1 | (0, 0, 1, 0, 0, 0) |
| 5 | 2 | (1, 0, 1, 0, 0, 0) |
| 6 | 2 | (0, 1, 1, 0, 0, 0) |
| 7 | 3 | (1, 1, 1, 0, 0, 0) |
| 8 | 1 | (0, 0, 0, 1, 0, 0) |
| 9 | 2 | (1, 0, 0, 1, 0, 0) |
| 10 | 2 | (0, 1, 0, 1, 0, 0) |
| 11 | 3 | (1, 1, 0, 1, 0, 0) |
| 12 | 2 | (0, 0, 1, 1, 0, 0) |
| 13 | 3 | (1, 0, 1, 1, 0, 0) |
| 14 | 3 | (0, 1, 1, 1, 0, 0) |
| 15 | 4 | (1, 1, 1, 1, 0, 0) |
| 16 | 1 | (0, 0, 0, 0, 1, 0) |
| 17 | 2 | (1, 0, 0, 0, 1, 0) |
| 18 | 2 | (0, 1, 0, 0, 1, 0) |
| 19 | 3 | (1, 1, 0, 0, 1, 0) |
| 20 | 2 | (0, 0, 1, 0, 1, 0) |
| 21 | 3 | (1, 0, 1, 0, 1, 0) |
| 22 | 3 | (0, 1, 1, 0, 1, 0) |
| 23 | 4 | (1, 1, 1, 0, 1, 0) |
| 24 | 2 | (0, 0, 0, 1, 1, 0) |
| 25 | 3 | (1, 0, 0, 1, 1, 0) |
| 26 | 3 | (0, 1, 0, 1, 1, 0) |
| 27 | 4 | (1, 1, 0, 1, 1, 0) |
| 28 | 3 | (0, 0, 1, 1, 1, 0) |
| 29 | 4 | (1, 0, 1, 1, 1, 0) |
| 30 | 4 | (0, 1, 1, 1, 1, 0) |
| 31 | 5 | (1, 1, 1, 1, 1, 0) |
| 32 | 1 | (0, 0, 0, 0, 0, 1) |
| 33 | 2 | (1, 0, 0, 0, 0, 1) |
| 34 | 2 | (0, 1, 0, 0, 0, 1) |
| 35 | 3 | (1, 1, 0, 0, 0, 1) |
| 36 | 2 | (0, 0, 1, 0, 0, 1) |
| 37 | 3 | (1, 0, 1, 0, 0, 1) |
| 38 | 3 | (0, 1, 1, 0, 0, 1) |
| 39 | 4 | (1, 1, 1, 0, 0, 1) |
| 40 | 2 | (0, 0, 0, 1, 0, 1) |
| 41 | 3 | (1, 0, 0, 1, 0, 1) |
| 42 | 3 | (0, 1, 0, 1, 0, 1) |
| 43 | 4 | (1, 1, 0, 1, 0, 1) |
| 44 | 3 | (0, 0, 1, 1, 0, 1) |
| 45 | 4 | (1, 0, 1, 1, 0, 1) |
| 46 | 4 | (0, 1, 1, 1, 0, 1) |
| 47 | 5 | (1, 1, 1, 1, 0, 1) |
| 48 | 2 | (0, 0, 0, 0, 1, 1) |

TABLE 8-continued

| $I_{TRP}$ | $k_{TRP}$ | $(b'_0, b'_1, \ldots b'_{NTRP-1})$ |
|---|---|---|
| 49 | 3 | (1, 0, 0, 0, 1, 1) |
| 50 | 3 | (0, 1, 0, 0, 1, 1) |
| 51 | 4 | (1, 1, 0, 0, 1, 1) |
| 52 | 3 | (0, 0, 1, 0, 1, 1) |
| 53 | 4 | (1, 0, 1, 0, 1, 1) |
| 54 | 4 | (0, 1, 1, 0, 1, 1) |
| 55 | 5 | (1, 1, 1, 0, 1, 1) |
| 56 | 3 | (0, 0, 0, 1, 1, 1) |
| 57 | 4 | (1, 0, 0, 1, 1, 1) |
| 58 | 4 | (0, 1, 0, 1, 1, 1) |
| 59 | 5 | (1, 1, 0, 1, 1, 1) |
| 60 | 4 | (0, 0, 1, 1, 1, 1) |
| 61 | 5 | (1, 0, 1, 1, 1, 1) |
| 62 | 5 | (0, 1, 1, 1, 1, 1) |
| 63 | 6 | (1, 1, 1, 1, 1, 1) |
| 64-127 | reserved | reserved |

Then, the UE#2 100-2 identifies that the SA included in the PSCCH received from the UE#1 100-1 collides with its own SA. For this, the UE#2 100-2 may compare its own T-RPT with the T-RPT of the UE#1 100-1. In this case, in the case that the T-RPT of the UE#2 100-2 itself are the same as the T-RPT of the UE#1 100-1 or substantially similar as a result of the comparison, and accordingly, the UE#2 100-2 is unable to receive the data from the UE#1 100-1, the UE#2 100-2 may transmit 'information indicating that the data will not be transmitted on the resource position that corresponds to the SA transmitted immediately before' to an arbitrary resource position which is ahead of the resource position that is going to use for the data transmission. This is referred to as a silent signal in the present specification.

Here, an arbitrary resource position for transmitting a silence signal may be determined as a predetermined specific place between D2D UEs (e.g., a part in a data resource or between an SA and a data resource).

For example, a resource position to which the UE#1 and the UE#2 are going to transmit data is described with reference to FIG. 14.

Figure 14:
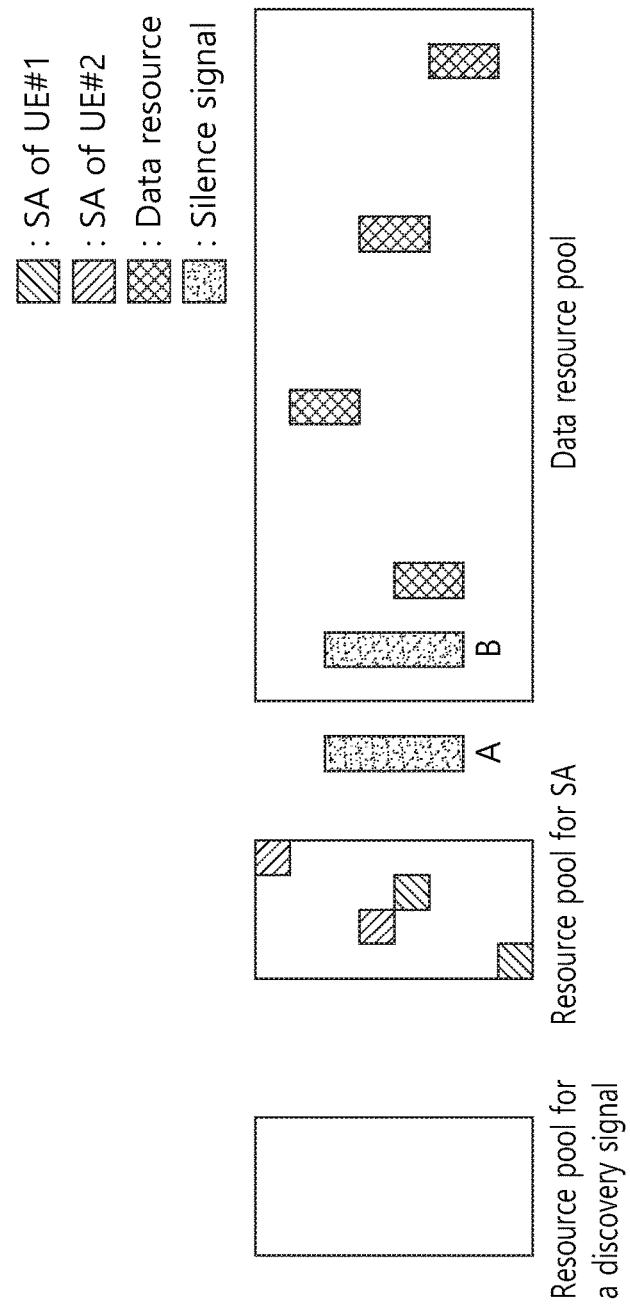
FIG. 14 illustrates an example of a resource used by UE#1 and UE#2.

FIG. 14 illustrates an example of a resource used by UE#1 and UE#2.

As it can be known with reference to FIG. 14, in the case that the resource that the UE#1 and the UE#2 are going to use are overlapped in the resource pool for transmitting and receiving data, the UE#2 may transmit a silent signal using resource A or resource B shown in FIG. 14. Alternatively, the silent signal may also be transmitted to other position except resource A or resource B.

As described so far, the UE#2 100-2 may quickly identify that the UE#1 100-1 is located in the coverage and operable as a relay through a discovery signal and a DMRS from the UE#1 100-1, and when its own SA collides with the SA of the UE#1 100-1, may withdraw its own SA quickly.

The embodiments of the present invention described so far may be implemented through various means. For example, the embodiments of the present invention may be implemented by hardware, firmware, software or the combination thereof. Particularly, this will be described by reference to drawing.

Figure 15:
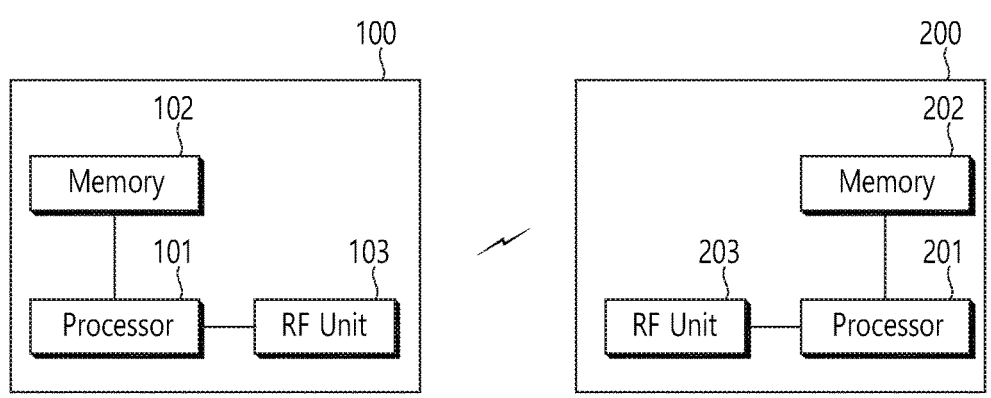
FIG. 15 is a block diagram illustrating a wireless communication system in which a disclosure of the present specification is implemented.

FIG. 15 is a block diagram illustrating a wireless communication system in which a disclosure of the present specification is implemented.

A base station 200 includes a processor 201, a memory 202, and an RF (radio frequency) unit 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of the base station may be implemented by the processor 201.

A UE 100 includes a processor 101, a memory 102, and an RF unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for selecting a neighboring user equipment (UE) to perform a Device to Device (D2D) communication, the method performed by a UE located out of coverage of a base station (BS) and comprising:
   receiving a Physical Sidelink Discovery Channel (PSDCH) including a discovery signal and a De-Modulation Reference Signal (DMRS) for demodulating the PSDCH from one or more neighboring UEs, wherein the PDSCH is scrambled by a scrambling sequence;
   obtaining a base sequence number of the received a DMRS through a blind detection;
   determining whether the one or more neighboring UEs are located in the coverage of the BS based on the obtained base sequence number;
   obtaining a scrambling sequence used for scrambling the PSDCH through a blind detection;
   obtaining one or more initializing parameters used by the neighboring UE for initializing the obtained scrambling sequence through a blind detection;
   determining whether at least one neighboring UE is able to operate as a relay based on the one or more initializing parameters; and
   selecting a UE located in the coverage of the BS and able to operate as a relay among the one or more neighboring UEs.

2. The method of claim 1, wherein the one or more initializing parameters are radio network temporary identifiers (RNTIs).

3. The method of claim 1, wherein selecting the UE comprises:
   selecting at least one UE located in the coverage of the base station among the one or more neighboring UEs; and
   selecting a UE operable as a relay among the at least one UE.

4. The method of claim 3, further comprising:
   selecting a resource for transmitting data to the selected UE; and
   transmitting a control channel including a scheduling assignment for the selected resource to the selected UE.

5. The method of claim 4, further comprising:
   receiving the control channel including the scheduling assignment from the selected UE.

6. The method of claim 4, further comprising:
   when a resource indicated by the scheduling assignment included in the transmitted control channel and a resource indicated by the scheduling assignment in the received control channel are overlapped, transmitting a silent signal for withdrawing the scheduling assignment included in the transmitted control channel to the selected UE.

7. A user equipment (UE) selecting a neighboring UE that is going to perform a Device to Device (D2D) communication, the UE being located out of coverage of a base station (BS) and comprising:
   a transmitting and receiving unit; and
   a processor for controlling the transmitting and receiving unit,
   wherein the processor is configured to perform:
   receiving a Physical Sidelink Discovery Channel (PSDCH) including a discovery signal and a De-Modulation Reference Signal (DMRS) for demodulating the PSDCH from one or more neighboring UEs, wherein the PDSCH is scrambled by a scrambling sequence;
   obtaining a base sequence number of the received a DMRS through a blind detection;
   determining whether the one or more neighboring UEs are located in the coverage of the BS based on the obtained base sequence number;
   obtaining a scrambling sequence used for scrambling the PSDCH through a blind detection;
   obtaining one or more initializing parameters used by the neighboring UE for initializing the obtained scrambling sequence through a blind detection;
   determining whether at least one neighboring UE is able to operate as a relay based on the one or more initializing parameters; and
   selecting a UE located in the coverage of the BS and able to operate as a relay among the one or more neighboring UEs.

8. The UE of claim 7, wherein the one or more initializing parameters are radio network temporary identifiers (RNTIs).

* * * * *